United States Patent
Craven et al.

(10) Patent No.: US 9,535,882 B2
(45) Date of Patent: Jan. 3, 2017

(54) SYSTEM AND METHOD FOR CONVERTING PAPER FORMS TO AN ELECTRONIC FORMAT

(71) Applicants: Jason Craven, San Diego, CA (US); Jeff Fildey, San Diego, CA (US); Jason Freitas, Long Beach, CA (US); Jonathan McIntire, San Pedro, CA (US); Andrew Stevens, Riverside, CA (US); Jonathan Stevens, Riverside, CA (US)

(72) Inventors: Jason Craven, San Diego, CA (US); Jeff Fildey, San Diego, CA (US); Jason Freitas, Long Beach, CA (US); Jonathan McIntire, San Pedro, CA (US); Andrew Stevens, Riverside, CA (US); Jonathan Stevens, Riverside, CA (US)

(73) Assignee: GoFormz, Inc.

( * ) Notice: Subject to any disclaimer, the term of this patent is extended or adjusted under 35 U.S.C. 154(b) by 41 days.

(21) Appl. No.: 14/213,943

(22) Filed: Mar. 14, 2014

(65) Prior Publication Data
US 2014/0380141 A1    Dec. 25, 2014

Related U.S. Application Data

(60) Provisional application No. 61/785,236, filed on Mar. 14, 2013.

(51) Int. Cl.
G06F 17/00    (2006.01)
G06F 17/21    (2006.01)
(Continued)

(52) U.S. Cl.
CPC ........... *G06F 17/212* (2013.01); *G06F 17/24* (2013.01); *G06F 17/243* (2013.01); *G06F 17/30569* (2013.01); *H04L 67/10* (2013.01)

(58) Field of Classification Search
CPC ...................................................... G06F 17/24
See application file for complete search history.

(56) References Cited

U.S. PATENT DOCUMENTS 8,731,973 B2 *   5/2014   Anderson ............ G06F 17/243
                                            345/629
9,286,335 B1 *   3/2016   Benton, Jr. ....... G06F 17/30312
(Continued)

OTHER PUBLICATIONS

Ted Padova et al., PDF Forms Using Acrobat and LiveCycle Designer Bible, 2009, John Wiley and Sons, p. 4, 12, 107, 110, 138, 139, 213, 445, 455, 602, 735.*

*Primary Examiner* — Laurie Ries
(74) *Attorney, Agent, or Firm* — Cooley LLP

(57) ABSTRACT

A system and method for creating and managing electronic forms is described. The system includes a processor configured to receive an image of a form and receive, via a network interface, form template information specifying at least a first input field. The form template information includes a first input field type selection and first field location information for the first input field. The first input field type is selected from a plurality of input field types and the first field location information is defined relative to the image. The processor stores the form template information within a memory. The electronic form is configured to be rendered by superimposing a representation of the first input field over the image of the form.

14 Claims, 24 Drawing Sheets

(51) Int. Cl.
  *G06F 17/24*    (2006.01)
  *H04L 29/08*    (2006.01)
  *G06F 17/30*    (2006.01)

(56) References Cited

U.S. PATENT DOCUMENTS

2010/0241948 A1* 9/2010 Andeen ............... G06F 17/2247
                                                        715/234
2013/0205188 A1* 8/2013 Lunde .................... H04L 67/42
                                                        715/224

* cited by examiner

FIG. 22

SYSTEM AND METHOD FOR CONVERTING PAPER FORMS TO AN ELECTRONIC FORMAT

CROSS-REFERENCE TO RELATED APPLICATIONS

The present application claims the benefit of priority under 35 U.S.C. §119(e) of U.S. Provisional Application Ser. No. 61/785,236, entitled SYSTEM AND METHOD FOR CONVERTING PAPER FORMS TO AN ELECTRONIC FORMAT, filed Mar. 14, 2013, and is related U.S. Nonprovisional application Ser. No. 14/213,905, entitled SYSTEM AND METHOD FOR CONVERTING PAPER FORMS TO AN ELECTRONIC FORMAT, filed on even date herewith, the contents of each of which are hereby incorporated by reference in their entirety for all purposes.

FIELD

The systems and methods of the disclosure relate to creation and management of electronic forms. In particular, but not by way of limitation, the present disclosure relates to systems and methods that provide for conversion of paper forms to electronic forms, systems and methods that provide for capturing information in the electronic forms and systems and methods for managing the electronic forms among a group of users.

BACKGROUND

Rapid growth of the mobile workforce has increased the pressure for organizations to find effective methods for managing data generated in the field. However, despite the proliferation of mobile electronic devices, like smart phones and tablet computers, most organizations still rely upon paper forms for their data management needs because of the familiarity and ease of use they have with their paper forms, and the complexities that come from converting these paper forms to electronic format. In fact, even if paper forms are converted to electronic format there often remains a need to easily render forms back to paper format when they must be distributed to customers, suppliers and colleagues. In addition, while there are clear and recognized advantages to collecting and managing data electronically, most organizations are ill equipped to deal with the intricacies of data synchronization, management, storage and replication. And even if organizations were capable of managing their data, there is minimal value if they can't simply and effectively share the data and mine it for improved business intelligence. Ultimately, despite a desire for change, the perceived benefits of electronic data management are often not enough to replace good old-fashioned paper forms for most organizations.

Although paper forms and current electronic information systems are functional, they are not efficient or otherwise satisfactory. Accordingly, a system and method are needed to address the shortfalls of present technology and to provide other new and innovative features.

SUMMARY

Exemplary embodiments of the teachings disclosed herein are shown in the drawings are summarized below. These and other embodiments are more fully described in the Detailed Description section. It is to be understood, however, that there is no intention to limit the invention to the forms described in this Summary or in the Detailed Description. One skilled in the art can recognize that there are numerous modifications, equivalents and alternative constructions that fall within the spirit and scope of the disclosed teachings as expressed in the claims.

In one aspect, an exemplary method of creating an electronic form in accordance with the disclosure includes receiving an image of a form, and receiving form template information specifying at least a first input field, the form template information including a first input field type selection and first field location information for the first input field wherein the first input field type selection is selected from a plurality of input field types and the first field location information is defined relative to the image. The method further includes storing the form template information within a memory, where the electronic form is configured to be rendered by superimposing a representation of the first input field over the image of the form.

In another aspect, an exemplary method in accordance with the disclosure includes receiving a selection of an electronic form, rendering, by a display of a device, an image of an original form upon which the electronic form is based, superimposing a plurality of input fields over a corresponding plurality of fields of the original form, and selecting one of the input fields to receive user input.

In another aspect in accordance with the disclosure, a method of interacting with an electronic form includes retrieving an electronic form template from a computer readable storage medium, the electronic form template being useable to generate the electronic form. The electronic form template includes first data representing an image of a form, second data defining a position of at least one input field relative to the image of the form, and third data representing a first field type associated with the first input field, the first field type being one of a plurality of field types. The method further includes displaying, upon a display device, the image of the form and superimposing a representation of the first input field over the image, receiving, via the first input field, first input data, and electronically storing the first input data.

In another aspect in accordance with the disclosure, a system for creating an electronic form includes memory and a processor coupled to the memory. The processor is configured to receive an image of a form, receive, via the network interface, form template information specifying at least a first input field. The form template information includes a first input field type selection and first field location information for the first input field where the first input field type selection is selected from a plurality of input field types and the first field location information is defined relative to the image. The processor is further configured to store the form template information within the memory. The electronic form is configured to be rendered by superimposing a representation of the first input field over the image of the form.

In another aspect in accordance with the disclosure a system includes memory and a processor coupled to the memory. The processer is configured to receive a selection of an electronic form, render, by a display of a device, an image of an original form upon which the electronic form is based, superimpose a plurality of input fields over a corresponding plurality of fields of the original form, and select one of the input fields to receive user input.

In another aspect in accordance with the disclosure, a system of interacting with an electronic form includes a memory and a processor coupled to the memory. The processor is configured to retrieve an electronic form template from a computer readable storage medium. The electronic form template is useable to generate the electronic form and includes first data representing an image of a form, second data defining a position of at least one input field relative to the image of the form, and third data representing a first field type associated with the first input field, the first field type being one of a plurality of field types. The processor is further configured to display, upon a display device, the image of the form and superimposing a representation of the first input field over the image, receive, via the first input field, first input data and electronically store the first input data in the memory.

In another aspect in accordance with the disclosure, a non-transient computer readable medium stores program code which, when executed by a processor, causes the processor to receive an image of a form, and receive form template information specifying at least a first input field. The form template information includes a first input field type selection and first field location information for the first input field where the first input field type selection is selected from a plurality of input field types and the first field location information is defined relative to the image. The program code further causes the processor to store the form template information within a memory. The electronic form is configured to be rendered by superimposing a representation of the first input field over the image of the form.

In another aspect in accordance with the disclosure, a non-transient computer readable medium stores program code which, when executed by a processor, causes the processor to receive a selection of an electronic form, render, by a display of a device, an image of an original form upon which the electronic form is based, superimpose a plurality of input fields over a corresponding plurality of fields of the original form, and select one of the input fields to receive user input.

In yet another aspect in accordance with the disclosure, a non-transient computer readable medium stores program code which, when executed by a processor, causes the processor to retrieve an electronic form template from a computer readable storage medium. The electronic form template is useable to generate the electronic form and includes first data representing an image of a form, second data defining a position of at least one input field relative to the image of the form, and third data representing a first field type associated with the first input field, the first field type being one of a plurality of field types. The program code further causes the processor to display, upon a display device, the image of the form, superimpose a representation of the first input field over the image, receive, via the first input field, first input data and electronically store the first input data.

As previously stated, the above-described embodiments and implementations are for illustration purposes only. Numerous other embodiments, implementations, and details of the invention are easily recognized by those of skill in the art from the following descriptions and claims.

BRIEF DESCRIPTION OF THE DRAWINGS

Various objects and advantages and a more complete understanding of the present disclosure and teachings herein are apparent and more readily appreciated by reference to the following Detailed Description and to the appended claims when taken in conjunction with the accompanying Drawings wherein:

FIG. 22 shows a screenshot of a user interface used to create and manage events triggered by completion of electronic forms in accordance with the disclosure;

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

As discussed above, despite the growing adoption and deployment of mobile electronic devices, like smart phones and tablet computers, organizations still heavily rely upon paper forms for their data capture needs. These paper forms can vary in nature from checklists, invoices, job activity reports, inventory reports, audits, treatment plans and much, much more. There are several reasons why paper is still a significant data capture method.

First, paper forms provide a familiar user interface. In particular, paper forms may have been used in an organization for many weeks to many years with little or no modification. Users have been trained to use these paper forms and can complete a paper form with or without any physical or electronic connection to any back end system.

Second, it has traditionally not been a simple task to convert paper forms to electronic format. In many cases, users must recreate their form from scratch using an electronic canvas with the resulting electronic form bearing no resemblance to their existing paper form. Moreover, users must design their electronic forms differently to support different platforms like desktop computers, laptop computers, tablet computers and smart phone devices.

Third, the vast majority of organizations do not possess the sophisticated technical resources required to manage the system of servers, networks, data security practices, and data storage devices to support the synchronization and management of mobile data.

Figure 1:
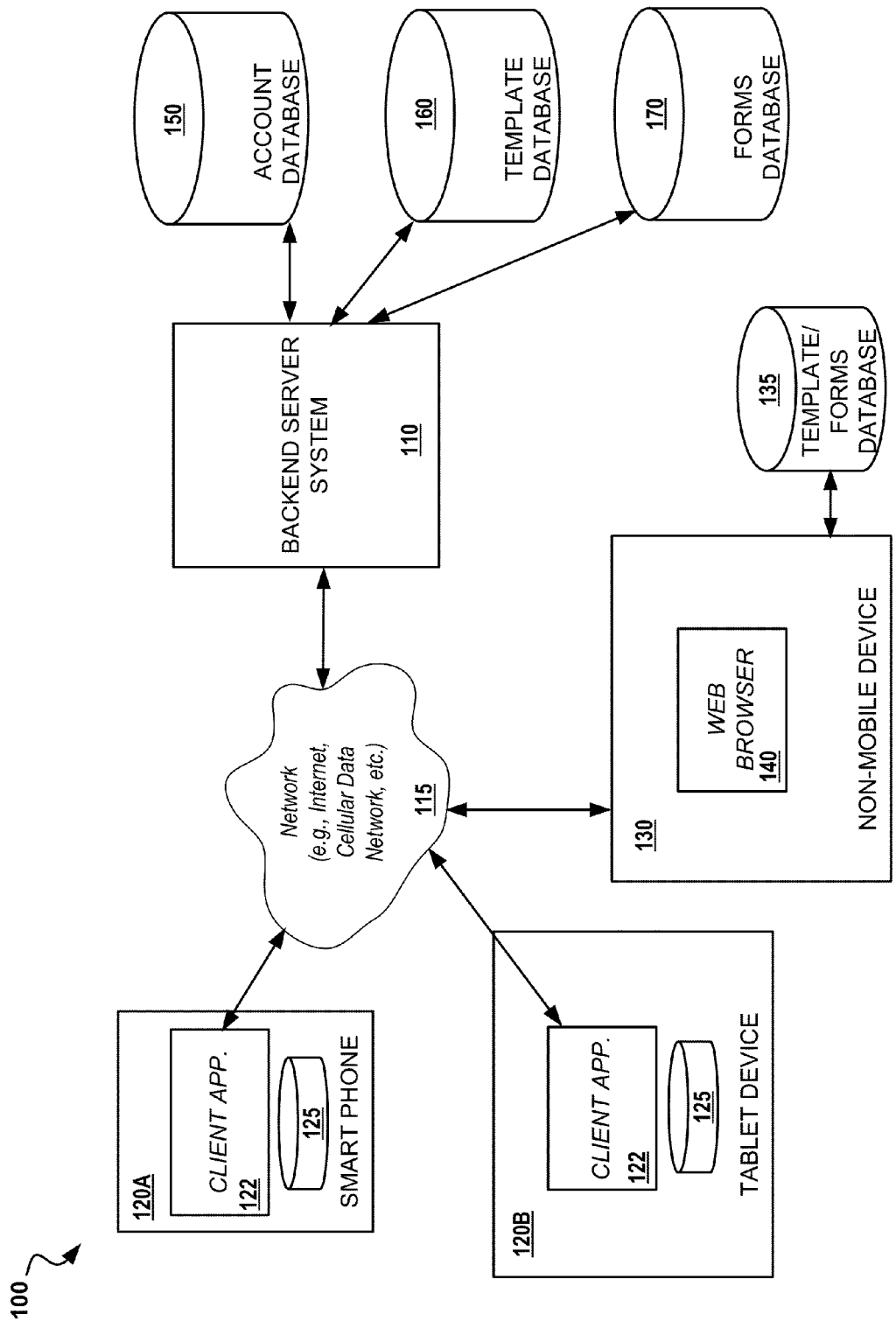
FIG. 1 illustrates details of a system on which embodiments of the methods described herein may be implemented.
Figure 2:
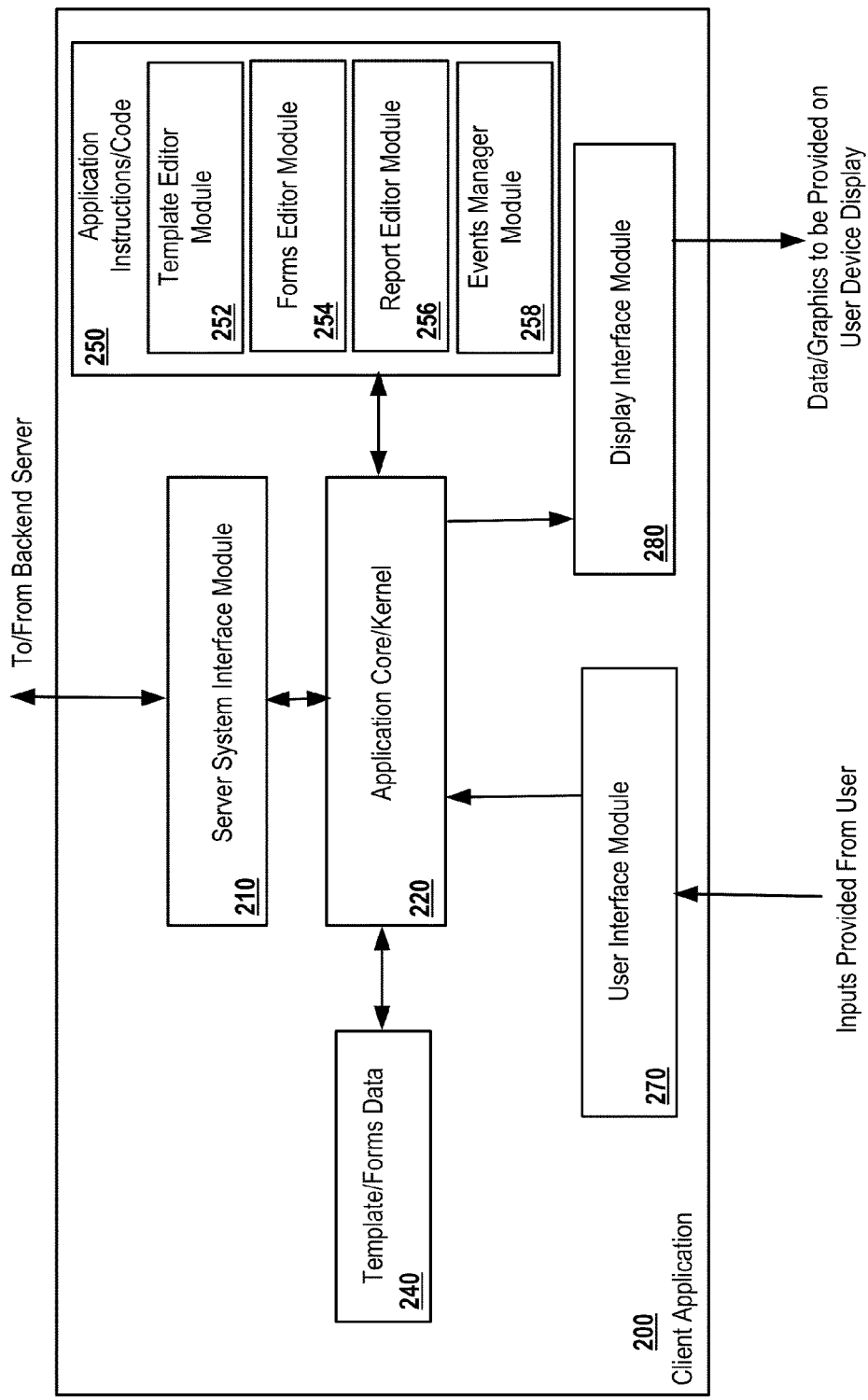
FIG. 2 illustrates details of an embodiment of an example client application for use on a user device.
Figure 3:
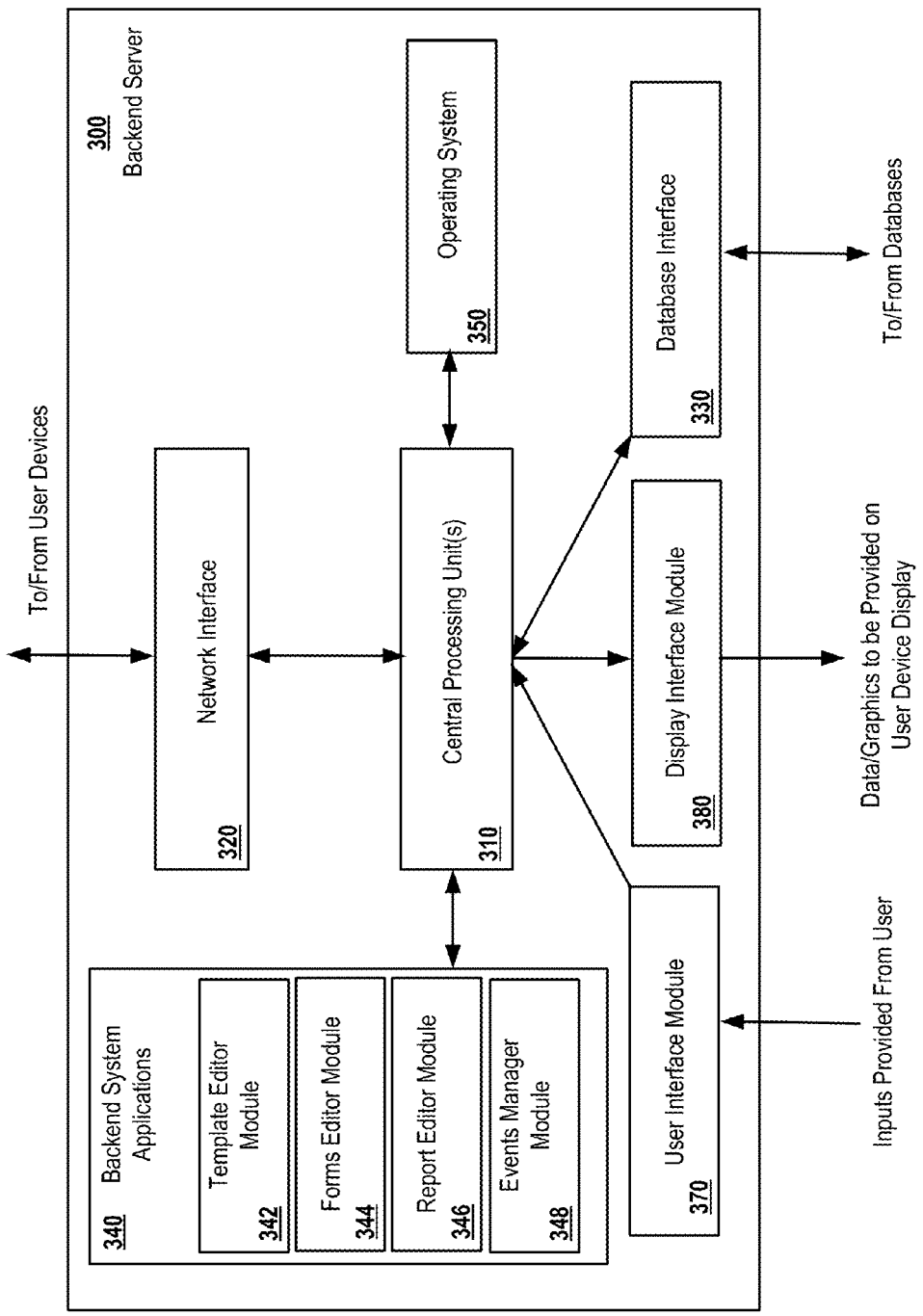
FIG. 3 illustrates details of an example server system for use with a client application such as shown in FIG. 2.

Before further describing various aspects and functionality of the electronic form creation and management methods described herein, it may be helpful to describe the general context and systems and devices on which embodiments may be implemented as shown in FIGS. 1 through 3.

For example, FIG. 1 illustrates details of a system 100 on which various embodiments may be implemented. System 100 includes one or more (typically many) mobile user devices 120, which may be netbooks, smart phones, personal digital assistants (PDAs), tablets, or other similar or equivalent mobile devices. As shown in FIG. 1, user device 120A is a smart phone and user device 120B is a tablet device, each of which includes a client application 122, which may be a customized application configured to utilize an operating system of the smart phone 120A or the tablet device 120B. The client application 122 enables the smart phone 120A or the tablet device 120B to gain access to a central server system such as backend server system 110. Mobile devices of the same account can communicate with each other via WiFi without communicating with the backend server 110 when the web backend is not available. This can be beneficial when users of the same account are working at a site that does not have coverage with the backend server 110 since the user devices can still transfer forms to each other when completed or when the responsibility for filling in a form transfers from one user to another.

In addition to mobile user devices 120, the system 100 includes non-mobile devices 130. Such non-mobile devices 130 may include desktop or notebook computers, for example. Non-mobile user device 130 uses a standardized web browser application 140, such as the Internet Explorer, Firefox, or Chrome browsers. Each of user devices 120A, 120B and non-mobile device 130 may communicate with the server system 110 via connections with a network 115, such as the Internet and/or another network such as a cellular data network, to server system 110.

For the mobile devices 120A and 120b, the backend server 110 interacts with the client application 122. The client application 122 can be distributed to user devices identified in the account information through an application store (not shown) for the device's operating system. Applications stores include, but are not limited to, Apple's App Store and Google's Google Play. When the client application 122 is launched, a user authenticates the device/application pair with a user name and password. Upon authentication, the client application 122 synchronizes with the system databases including a template database 160 and a forms database 170. During synchronization, a user device downloads all of the template and field information, as well as draft forms (forms in progress) and completed forms relevant to the user's account as determined by account configuration parameters in the account database 150. The client application 122 then stores all of this information in a local database, e.g., the memory 125, on the device.

In addition to synchronizing information at mobile devices upon initial authentication of the client application 122, synchronization can be performed with mobile devices 120 and non-mobile devices 130 at regular intervals established by the system and/or account configuration parameters. During synchronization, all updated data stored in the local database on the mobile device 120 and non-mobile devices 130 is securely transmitted to the template database 160 and the forms database 170 and any applicable updates stored in these databases are downloaded to the client application 122 or the web browser 140 and stored in the memory 125 or template/forms database 135.

Server system 110 may include or be connected to one or more databases. The exemplary system 100 includes an account database 150, the template database 160 and the forms database 170. The account database 150 stores information regarding user accounts and individual users associated with the user accounts of the system 100. At initial account setup, the backend server 110 establishes a user account within the account database 150 including receiving account information from one or more users associated with the account. The account information can include the names of individual users associated with the account as well as levels of access that individuals have to templates and forms associated with the accounts. The account information can also include various groups and the users in the groups. Such groups can include working groups such as project groups, teams, etc.

Each established account is logically segmented from any other user account in the account database 150. The account information also includes configuration information about the account. The account configuration information defines the specific user-generated configuration of the system for the account. The backend server provides utilities structured according to the configuration information. For example, multiple users can be added and managed within each account, electronic forms can be created, managed and automatically distributed to users within the account, data collected by all users in the account can be aggregated and stored based on the configuration information, data mining and reports can be automatically generated, system notifications can be generated based on configurable trigger events and general account management and subscription functions can be maintained. Once an account is created, one or more users may begin the process of converting paper forms into an electronic format and begin generating completed forms and reports as supported by the system.

The template database 160 includes various electronic form templates that have been created by the methods described herein. Templates are made up of a plurality of input fields that can be superimposed over an image of a form. The form image could be an original electronic image of a form such as a PDF of TIFF. Alternatively, the form image could have been created by scanning an original paper form. The input fields of a template are typically void of information except for default entries and entries that do not change. A user will fill in the input fields of a template and the completed template is referred to as a form.

The forms database 170 stores forms that are completed or at least partially completed. In other words, when a user downloads a template and fills in one or more input fields, a form is created and is then stored in the forms database 170. Users associated with a given account can have access to some or all of the forms as determined by the access rules, and group memberships that are stored in the account database 150.

Methods are provided for managing the data acquired by the electronic forms and stored in the forms database 170 and creating custom reports based on the stored report data. The methods for creating custom reports provide for data mining through the completed forms to retrieve information for the customized reports as well as integrating the acquired data with other external systems. The components of the system interact with each other using a data synchronization methodology in order to synchronize updates to templates, completed forms and completed reports.

Server system 110 will generally include other data storage devices as well as associated hardware, software, memory, peripheral interface devices, and the like, including modules to receive and store data and information, receive and process input from user devices and associated browsers or client applications, and receive and configure information from users to create templates, to utilize the templates to complete forms, to create reports from the draft forms and completed forms and to manage trigger events using the methods described below.

At user devices 120A and 120B, the client application program 122 may be downloaded and stored on the user device 120 to allow customized access to data and information on the server system 110. The client application program 122 is stored in memory 125. The memory 125 can also store previously downloaded templates and forms (completed forms or in-process forms). Alternately, or in addition, the standardized browser application 140 (as shown in non-mobile user device 130) may be provided to allow standardized web access and associated functionality in some implementations. The web browser application 140 as well as previously downloaded templates and forms are stored in a template/forms database 135 coupled to or included in the non-mobile device 130.

FIG. 2 illustrates details of an embodiment of a client application 200 and associated functional modules. Client application 200 may correspond with the client application 122 as shown in FIG. 1. Client application 200 may include a server system interface module 210 configured to provide an interface or data interchange with an associated server system, such as a server system 110 of FIG. 1. This interface functionality may be provided by other software and/or hardware modules in the particular user device, such as operating system functions, wired or wireless interface hardware and software, and the like. Application 200 may also include an application core or kernel module 220 configured to perform the basic functionality described subsequently with respect to client application 122 and/or user device operation. In particular, this functionality may be as illustrated in the figures and described subsequently herein. Client application 200 may further include a template/forms data module 240 to store data associated with the client application, such as templates and forms previously downloaded and/or created by a user, data being processed by the application core 220, data received from the server system 110, and/or other data or information.

Client application 200 may include application instructions or computer code in an application module 250. The code or instruction module 250 may include a specific series of instructions and steps to perform the functions described subsequently herein. The computer code or instructions may be stored on a computer readable medium configured to provide instructions to a processor or other similar or analogous device, such as a programmable logic device, DSP, etc.

The application module 250, in this exemplary embodiment, includes instructions or computer codes for implementing a template editor module 252, a forms editor module 254, a report editor module 256 and an events manager module 258. The template editor module 252 provides a user interface to receive inputs to create templates in accordance with the methods described herein. The forms editor module 254 provides a user interface to receive inputs to utilize the templates previously created to create filled-in forms in accordance with the methods described herein. The report editor module 256 provides a user interface to allow a user to retrieve data from selected forms that have been previously filled in order to generate reports in accordance with the methods described herein. The events manager module 258 provides a user interface to allow creation of event mechanisms in the templates where the event mechanisms are triggered by user definable triggers that occur during utilization of the templates to create filled-in forms.

Some of the modules 252-258 may be omitted from mobile devices 120 and/or non-mobile devices 130, depending on the embodiments. For example, in one embodiment, the client application 122 of the mobile device 120A only includes the forms editor module 254. In this embodiment, the mobile device 120A can perform the methods for utilizing already created templates obtained from the template database 160 to create filled in forms. However, in order to create templates, create reports and manage events, the mobile device 120A of this embodiment interacts with a template editor module 342, a report editor module 346 and an events manager module 348 of the backend server 110. Other embodiments of mobile devices and non-mobile devices can include various combinations of the template editor module 252, the forms editor module 254, the report editor module 256 and the events manager module 258.

Client application module 200 may further include a user interface module 270 configured to receive input from a user, such as user selections, search data or information, or other information provided from a user. In addition, the client application module 200 may include a display interface module 280 configured to provide output information to a user on a display device (not shown) of a user device, such as an LCD or other display screen.

FIG. 3 illustrates one embodiment of details of aspects of a server system 300, which may correspond with server system 110 of FIG. 1. Server system 300 may include a core functional module or kernel 310, which may be configured as a module to control overall operation of the system as well as support functionality as described subsequently herein. The core module 310 utilizes functions provided by an operating system 350. A network interface module 320 is configured to communicate with user devices such as mobile devices 120A and 120B or non-mobile device 130. A backend system applications module 340 may be coupled to core module 310 to enable user selection of or targeted selection of content for delivery to users. The backend systems applications module 340 may be coupled to databases via a database interface 330. The database interface 330 can be coupled to databases such as the account database 150, the template database 160 and the forms database 170 of FIG. 1.

The backend systems applications module 340, in this exemplary embodiment, includes instructions or computer codes for implementing a template editor module 342, a forms editor module 344, a report editor module 346 and an events manager module 348. The template editor module 342 provides a user interface to receive inputs to create templates in accordance with the methods described herein. The forms editor module 344 provides a user interface to receive inputs to utilize the templates previously created to create filled-in forms in accordance with the methods described herein. The report editor module 346 provides a user interface to allow user to retrieve data from selected forms that have been previously filled in order to generate reports in accordance with the methods described herein. The events manager module 348 provides a user interface to allow creation of event mechanisms in the templates where the event mechanisms are triggered by user definable triggers that occur during utilization of the templates to create filled-in forms.

Additional interface modules may be included in server system 300, either configured separate or integrated in functionality with other modules. For example, a user may access the system through a user device interface 370, which may be operated in conjunction with a client application executing on a user device and/or a web browser. In addition, a user can access the backend server applications module 340 via the user interface module 370 in order to create templates and or enter data into templates to create forms. A display interface module 380 provides data and graphics information to be displayed on a display device of a user device or a display device coupled directly to the user device interface 370.

The backend system applications module 340 may comprise non-transitory computer-readable storage media, such as memory devices or other storage components to store instructions for execution by computer processors. The instructions may be used to implement the various functions described subsequently herein.

Figure 4:
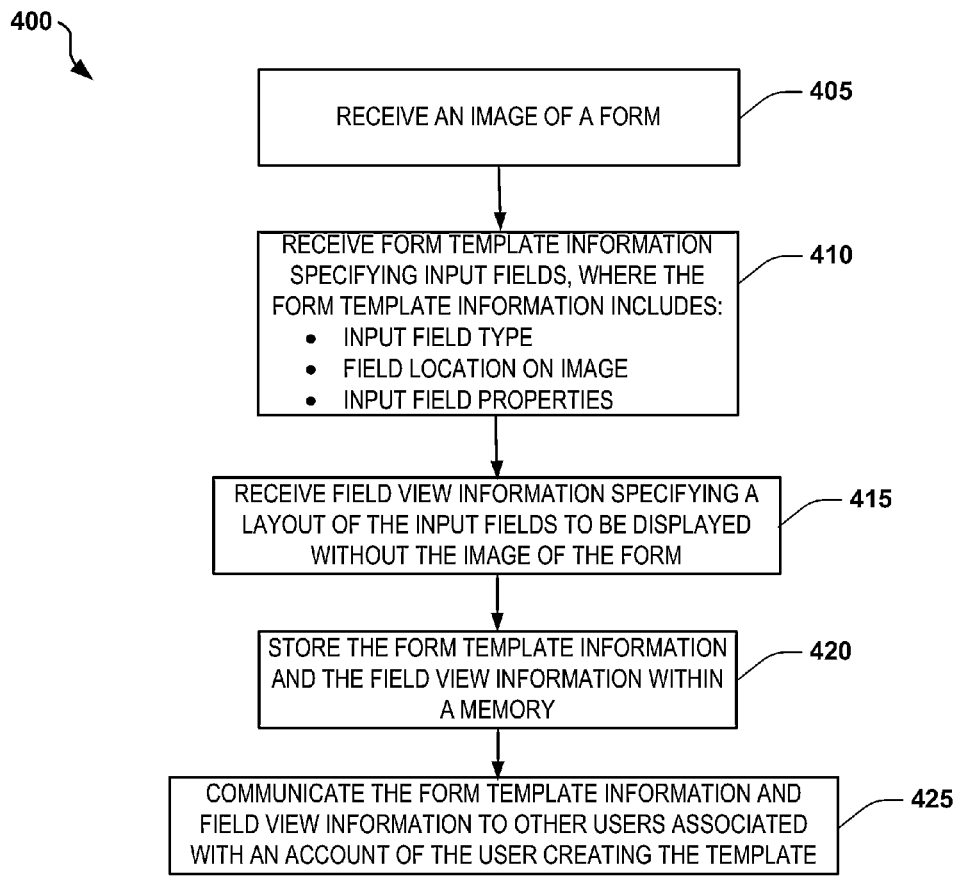
FIG. 4 illustrates a flowchart of an exemplary process for creating an electronic form template in accordance with the disclosure.
Figure 5:
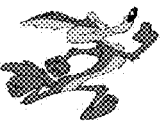
FIG. 5 shows an image of an electronic form used in the process of FIG. 4.

Referring to FIG. 4, a process 400 for creating an electronic form template includes the stages shown. The process 400 can be performed by a user device associated with one of the accounts in the account database 150. The user device can be one of the mobile devices 120 or a non-mobile device 130, referred to herein as user devices. The user devices communicate with the backend server 110 or 300, referred to from herein as the backend server 110. For user devices that do not include the template editor module 252, the user device will utilize the template editor module 242 of the backend server 110 or 300 to perform some of the actions in the process 400. At stage 405, the user selects an image of a form to be the background of a newly created electronic form. FIG. 5 shows an exemplary image of a form 500. The form 500 can be a scanned image (PDF, JPEG, or TIFF, for example) of an original paper form or an image of an existing electronic form. The image can be a file stored on one of the user devices, stored on the backend server 110 or stored somewhere on the internet in a "cloud" device such as a drop box. The image of the form is received by the client application 122, communicated to the backend server 110 at stage 405 and stored in the template database 160.

The image of a standard paper form, or an image resembling a standard paper form, provides an intuitive user interface that allows users to easily capture and manage information in an electronic format. In this regard, the most intuitive visual interface is one that mirrors the existing paper form that users in the account have already been trained to complete. The layout of the paper form is familiar and users already understand the most efficient means to capture information using the paper form.

The image of the form received at stage 405 serves as the visual reference for the electronic form being created during the process 400. When completed, the electronic form template, including the image of the form is stored in the template database 160 for later reference by other users and/or elements of the system, including the client application 122 and the web browser 140. From herein, the functions performed by the user device will be described as being performed by the client application 122, but it is to be understood that the web browser 140 of the non-mobile device 130 could also perform these functions. Upon receiving the image of the form, the client application 122 displays the image of the paper form 500 as the background of an editor canvas in the client application 122.

Figure 6:
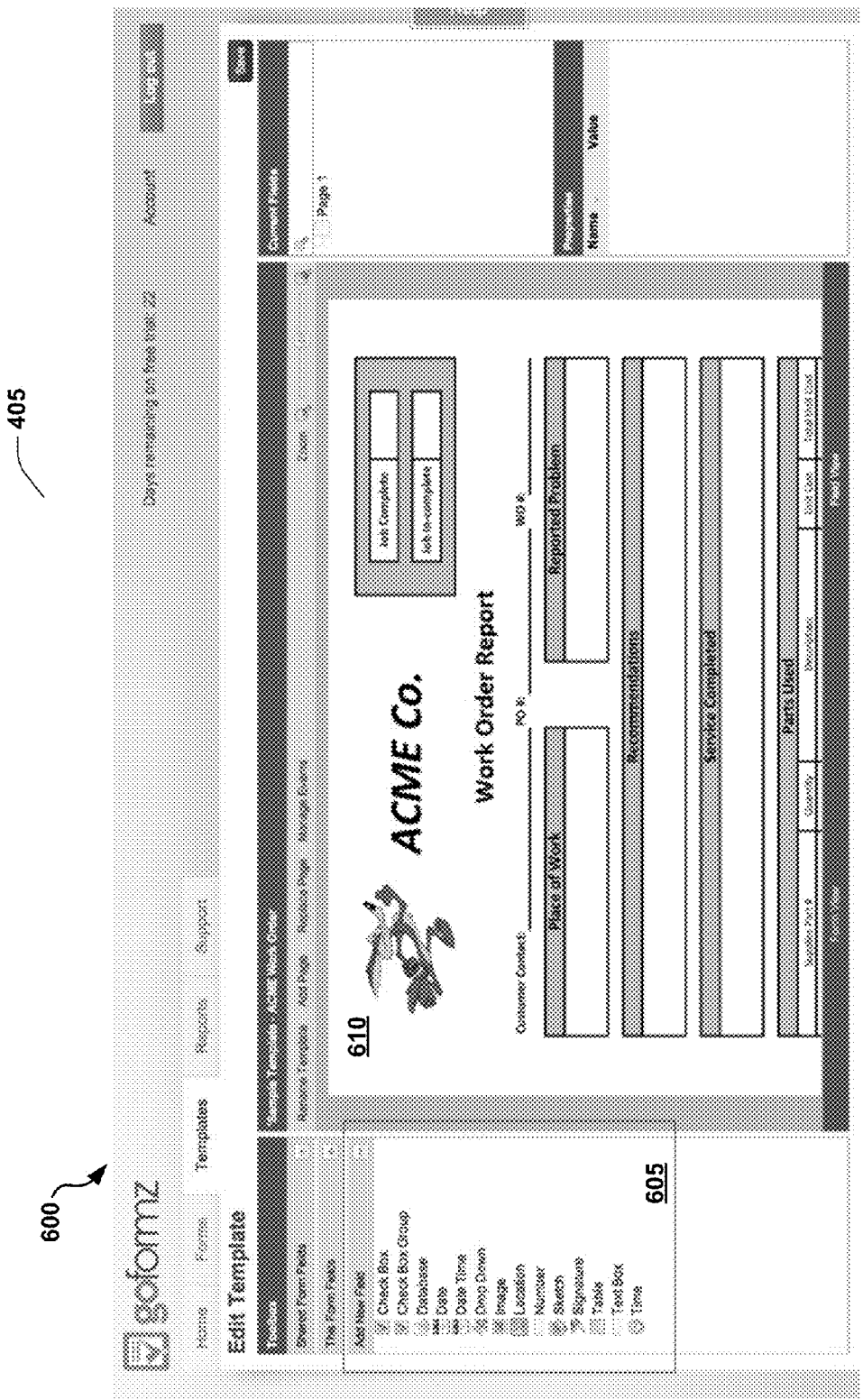
FIG. 6 shows a screenshot of a user interface used in the process of FIG. 4.

At stage 410, the client application 122 receives form template information specifying one or more input fields corresponding to portions of the form image, such as the form image 500. FIG. 6 shows an exemplary screenshot 600 of a user interface including an editor canvas 610, of the client application 122. The screenshot 600 shows a list 605 of input field types. The user interface of screenshot 600 provides a what-you-see-is-what-you-get drag and drop interface to simplify set up of the electronic form. In this exemplary editor canvas 610, a user defines input fields by dragging field types from the list 605 onto the canvas 610. The field type list 605 defines several different field types including, but not limited to, a check box field, a check box group field, a barcode field (not shown), a database field, a date field, a date and time field, a drop down menu field, an image field, a location field, a number field, a sketch field, a signature field, a table field, a text field and a time field.

Figure 7:
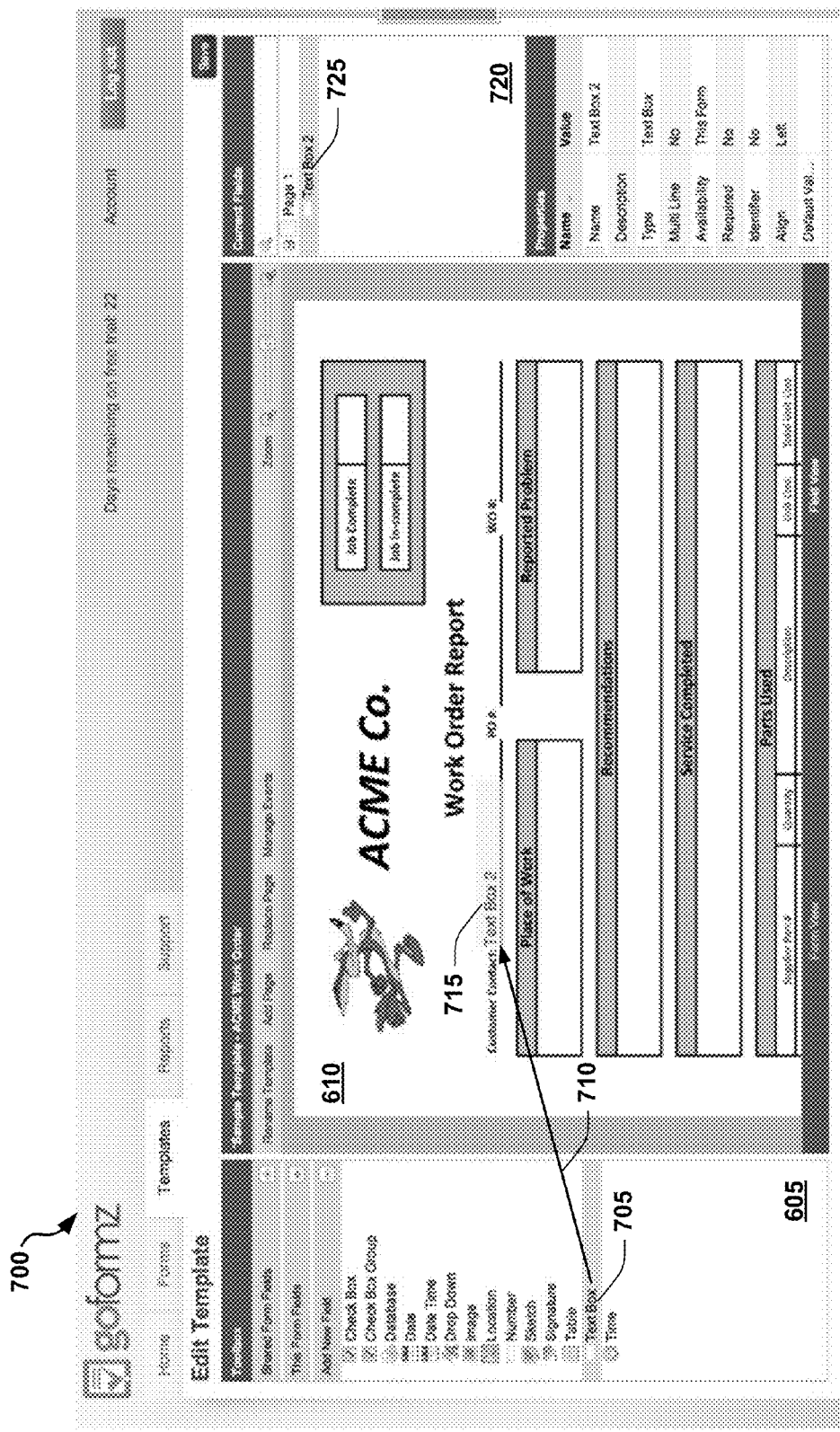
FIG. 7 shows another screenshot of a user interface used in the process of FIG. 4.

FIG. 7 shows another screenshot 700 of the user interface. In FIG. 7, a drag-and-drop action is depicted. A text box input field type 705 is selected by a user, dragged (as indicated by an arrow 710) to the editor canvas 610 and positioned at an input field 715 entitled Customer Contact. In response to this drag-and-drop procedure, the client application 122 stores information regarding the field type (Text Box), the location (the x, y location corresponding to the Customer Contact field 715). In addition, the user has titled the Text Box input field "Text Box 2." This title is also stored in association with the information regarding the Text Box 2 input field. The client application 122 also stores an entry 725 in a Current Fields box 720 which lists the newly created Text Box 2 as one of the Current Fields in Page 1 of the current template being created.

For each field type selected at stage 410, the user may modify specific properties including, but not limited to, font name, font size, color, row height, automated formatting and more. In addition, the user may define default values for fields using elements that include, but are not limited to, static values, calculations, database access and conditional logic. These default value settings are used to provide automation to the electronic form to simplify data collection and management as well as improve data capture, accuracy and consistency.

As input field types are added to the canvas 610, the client application 122 logs the x and y spatial coordinates of the input field types relative to the background image and stores these coordinates along with the parameters of each field in the memory 125 (or the template/forms database 135) and communicates the parameters to the backend server 110 to be stored in the template database 160. This approach of providing a visual reference makes it easy for a user to simply place each field in its appropriate position on the document and size the field to fit the fields on the image of the form.

A major difference between this method and other previous methods is that the previous methods take fields and relate each field to an electronic entry. The method used in the process 400 uses locations on the form and relates those locations to an electronic entry and the location is an intricate part of the electronic form. In addition, the electronic entry includes information describing a field type of a plurality of different form field types where the different field types are each configured to provide a different user interface to receive input to complete the electronic form.

The field type list 605 includes a check box field type and a check box group field type. These "check box" related field types include several different types of selection mechanisms besides just checkboxes. The selection mechanisms of the checkbox field types include a checkbox, a check circle, a fill-in circle, etc. The checkbox field type is stand-alone circle or box that can be filled-in or checked or not. The checkbox group field type is a selection group such as a check box group or a fill-in the circle group. In a group, the user can specify how many of the boxes or circles can be filled in (e.g., only one of two, one of three, or whatever, can be chosen) at the same time. The user can also specify that the checkbox field type use circles, square, X's, check marks, etc. A circle can be used to circle a selection of male/female, for example. You can also have a fill in the circle field to select male or female.

Check box groups are typically used to select from a group of related selections (job status group: complete and not complete, for example). The user selects the locations of each box in the group. The user also controls how many boxes in a group can be selected. A group is a single field as far as report generation and importing to other databases.

The field types list 605 also includes a database field type. A database is related to a stored group of entities or possible answers (e.g., a CSV file). For example, an author box can be associated with a group of names (e.g., employees) and when a user starts entering the name into the input field, the client application 122 will display possible names that complete the name and the user can select the name such that the client application downloads the name and other related information, as determined by the field properties specified by the user.

As an example, a database file (e.g., CSV) can list a plurality of customer contacts including several columns (name, address, phone, etc). The user can choose a field to be a Data Source. The user can upload the CSV file to the client application 122 in association with the Database input field. In this way, a user that is filling in the template created to include the Database field can import the CSV file to the backend server 110 and a user can later choose the data from the CSV file that he wants to fill in the Database field while completing a form based on the template. In addition, in response to any text that the user enters (e.g., John S), the system will start searching the CSV file for an existing name starting with John S and bring up the existing data for John Smith before the user even finishes typing the name John Smith.

At stage 410, the user can program input fields to have a default value (e.g., for common entries). Fields can also be configured by the user to include formulas (e.g., if this field is true, then multiply one value by another value to arrive at a value for the field). The Default Value can also be a database reference. A Database field can be associated with multiple cells in a row of the database file. In this way, the user can fill in several fields of a form by simply creating a formula that takes a first field value (e.g., customer name), looks up the first field in a specified column of a data source, grabs specified other values from other columns in the same row as the first field value and immediately puts the other values in other specified fields (or the same first field), as determined by the formula. This eliminates the need for several drop-down fields.

Date and date time field types use a date picker and a time picker for entering the value of the field. An image field type can be used to allow a user to load a JPEG file (or other image) into the field of the form. The image is stored in memory by the client application 122 with location information in order to appear in a specified portion of the form.

A sketch field type is similar to an image field in that it allows a user to bring in a picture (optionally), but the user can then make line sketches on the field (e.g., draw boxes, add text boxes, hand draw, add symbols, etc.). A signature field type allows a user to input a signature via a touch screen.

A Table field type allows the user to specify a table with a number of columns and rows (default could be 3 columns and 4 rows) and each column and row can be sized and named. Each box in the Table can be a different field type (e.g., text, drop down, database, time, time/date, currency, phone number, etc.). Each cell/column/row can be sized (font), set to field type. The user can size the table to line up exactly with the original table in the paper form.

The user can designate a field as a shared field and this would enable the user to pull this field into another template. This saves time by not requiring all the characteristics of the field to be created again. This was mainly developed for reporting. As is described below, a report generator can look in other form's shared fields for the exact same field in order to find the same field name in every form. One could run a report that says anywhere customer name equals name1, pull information from all the forms that have name1 in the "customer name" field.

In Multipage documents, the pages and locations are kept separate and related to each field. A field (e.g., customer contact) on one page can be related to another field on another page and the data can be automatically sent to the field on the next page. The user simple drags the same field from the list of fields on page 1 onto the location on page 2 (contact name for example). Filling one "customer contact" field on one page fills in all "customer contact" fields.

At stage 415, the client application 122 receives information regarding the layout of the Field View of the input fields of the template. The Field View information determines how the input fields selected by the user at stage 410 are displayed in a Field View list of fields which does not include the background image of the original form. The Field View is typically used on smaller devices such as smart phones where a full image of the form, as in the Form View, would not be easily viewable on the device's small screen.

Figure 8:
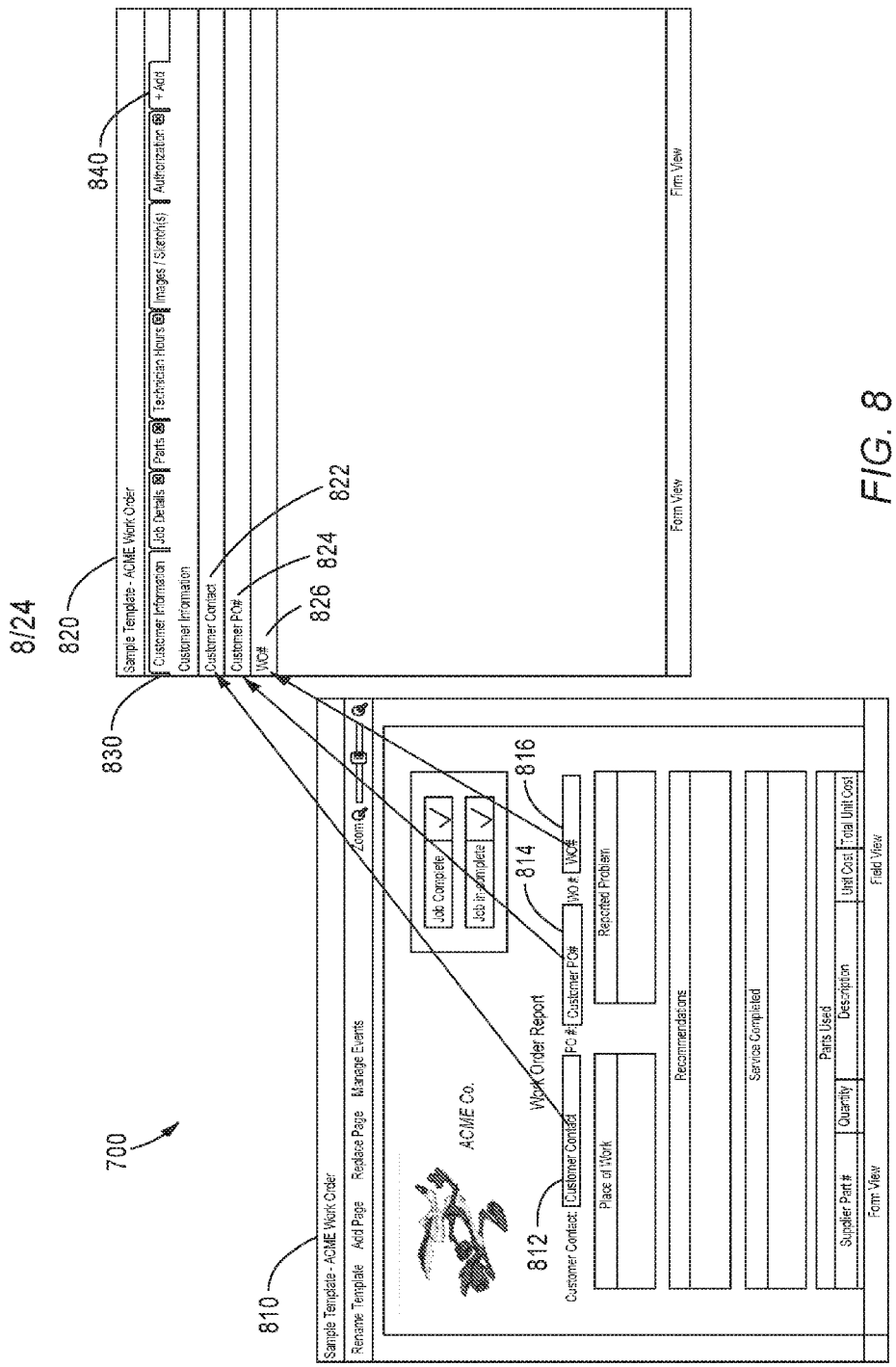
FIG. 8 shows a pair of screenshots showing interconnections between items in form view and respective items in a field view created by the process of FIG. 4.

FIG. 8 shows a pair of screenshots showing interconnections between items in Form View 810 and respective items in a Field View 820. The Form View 810 is created by the user as discussed above at stage 410. The client application 122 creates the entries in the Field View 820 in response to the input fields created by the user. In FIG. 8, input fields 812, 814 and 816 in the Form View 810 are shown in the Field View 820 as fields 822, 824 and 826, respectively.

At stage 415, the user can provide input to the client application that determines how the Field View 820 appears.

The user can create sublists of fields within the list of fields. The order of appearance of the fields in the fields list can be rearranged. As shown in the Field View 820, several tabs 830 can be created and fields can be located in the different tabs. The tabs 830 include exemplary tabs including Customer Information, Job Details, Parts, Technician Hours, Images/Sketches and Authorizations. The user can add more Tabs by selecting an "Add" button 840.

By including both the Form View 810 and the Field View 820, the template is configured so that data can be captured efficiently and effectively using both small and large devices as well as mobile and non-mobile devices.

At stage 420, the client application 122 stores the form template information received at stage 410 and the field view information received at stage 415 within a local memory such as the memory 125 and/or the template/forms database 135. In addition, the client application 122 communicates the form template information and the field view information to the backend server 110 which in turn stores the information in the template database 160. This entire set of template configuration information including Form View and Field View information is considered by the system 100 to be a form template.

Figure 9:
FIG. 9 shows a screenshot of a user interface used in the process of FIG. 4.

FIG. 9 illustrates a screenshot 900 of an exemplary user interface for allowing a user to upload the template to the backend server 110 to be stored in the template database at stage 420. A browse box 920 is displayed by the client device 122 to allow the user to browse local memory such as the memory 125 of the mobile devices 120 or the template/form database 135 of the non-mobile device 130 to find the newly created template. The selected template is then uploaded after the user selects the upload button 925 All elements of the new template are stored in the template database 160, including all fields, their respective field types, their location relative to the canvas image, and their user-defined properties. Users can subsequently create new filled-in forms using this template.

At stage 425, the client application, and/or the backend server 110, communicates the form template information and the field view information to other users associated with the account of the user that created the template. The communication at stage 425 can be in response to a request for the template from one of the mobile devices 120 or the non-mobile device 130. The communication could also be in response to a periodic synchronization process with one of the mobile devices 120 or the non-mobile device 130. The synchronization can be automatically triggered due to the template being newly created. If the template, or other templates, is updated at a later time, the synchronization of the updated templates can also be triggered.

The process 400 is exemplary only and modifications to the process can be made without departing from the scope of the methods described herein. For example, stages may be omitted, added or rearranged.

Figure 10:
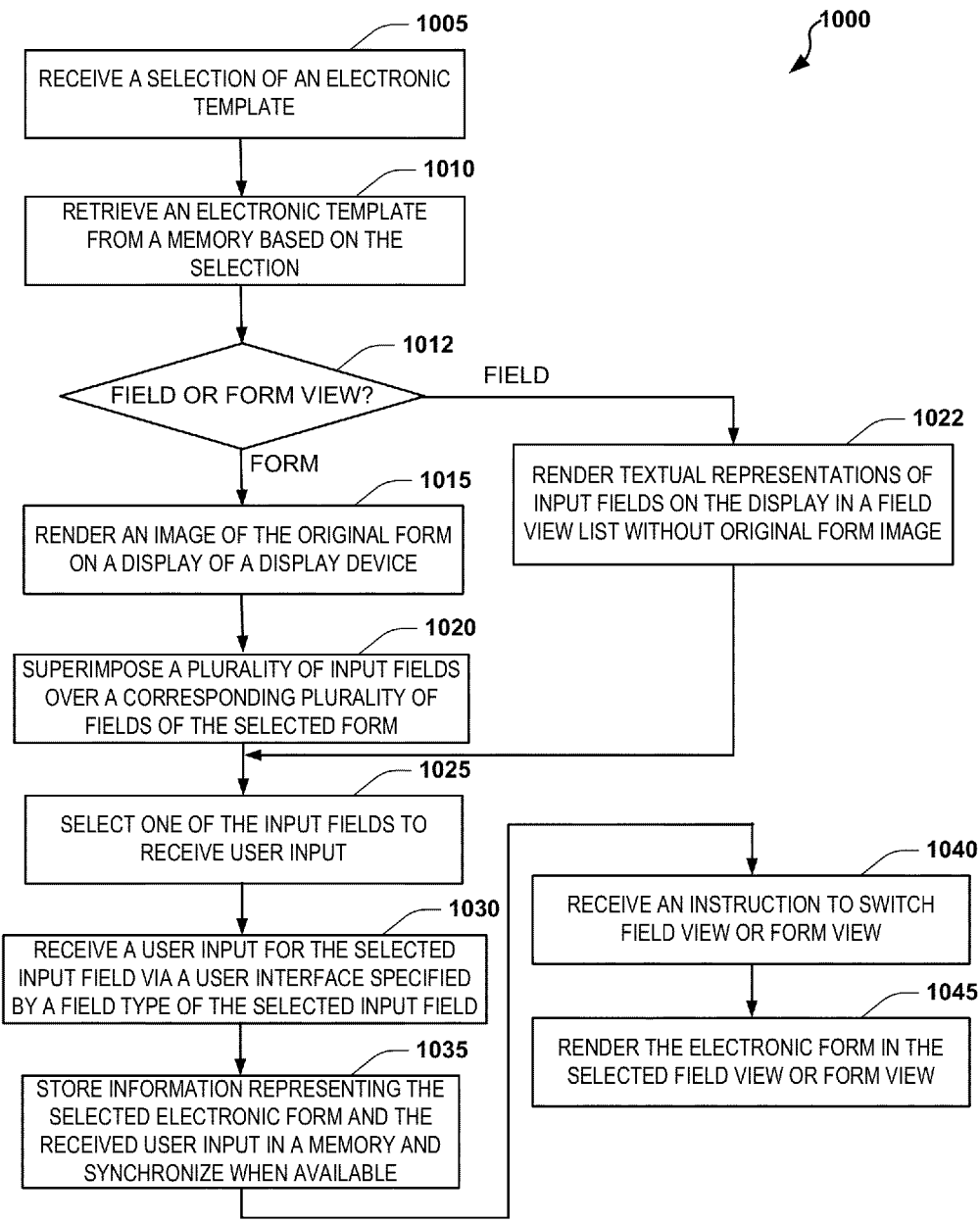
FIG. 10 illustrates a flowchart of an exemplary process for interacting with an electronic form created by the process of FIG. 4 in accordance with the disclosure.

Referring to FIG. 10, a process 1000 for interacting with electronic forms created by the process 400 of FIG. 4 includes the stages shown. The process 1000 can be performed at one of the mobile devices 120 or the non-mobile device 130, and in communication with the backend server 110. The process 400 can be performed during day-to-day activities of users of these devices.

At stage 1005, the client application 122 receives an input from a user via a user interface of a user device. The received input comprises information indicative of a selection of an electronic template. The electronic template is one of the electronic templates created using the process 400 of FIG. 4.

Figure 11:
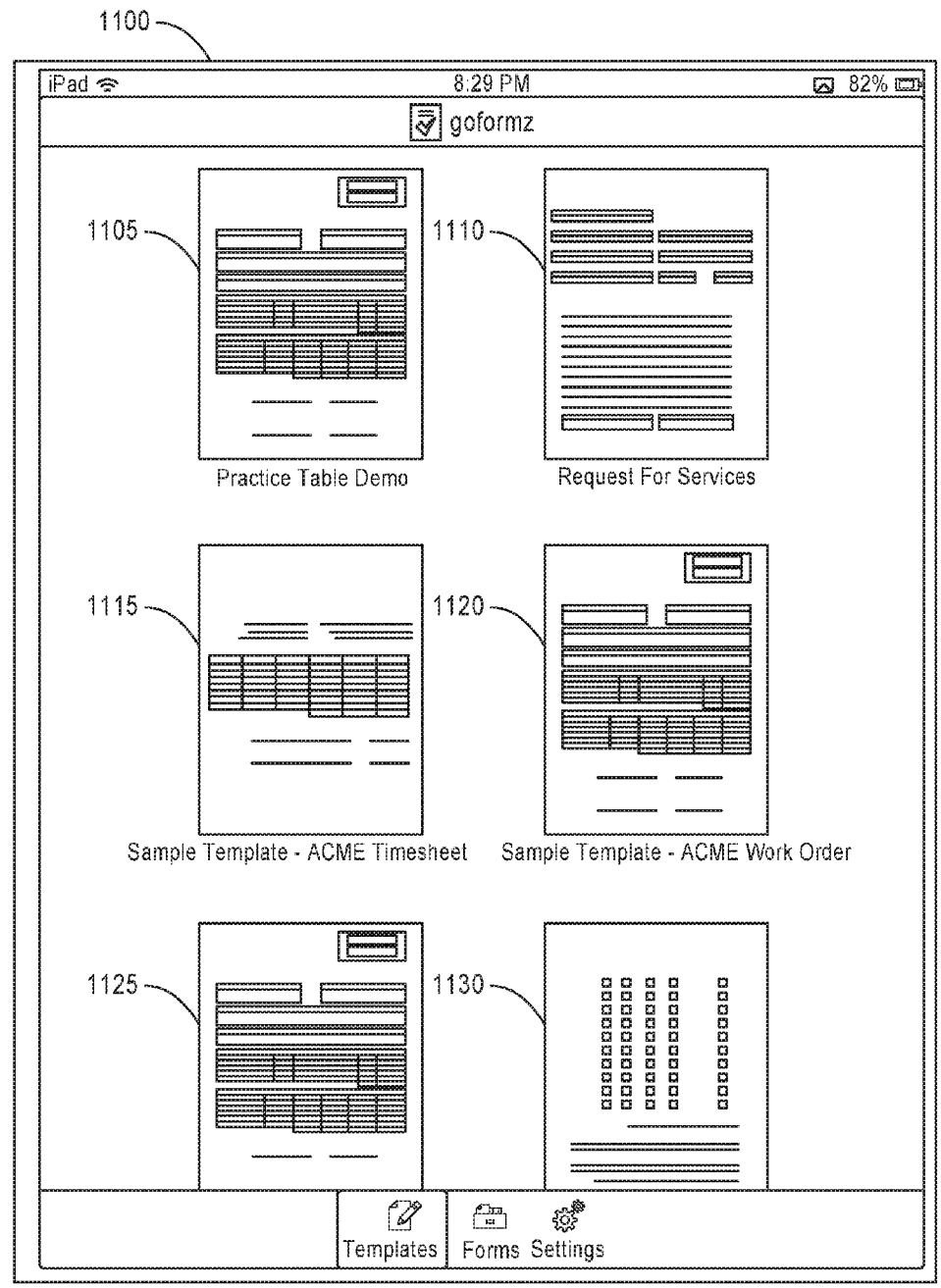
FIG. 11 shows another screenshot of a user interface used in the process of FIG. 10.

FIG. 11 shows a screenshot 1100 of an exemplary user interface for allowing a user to input the selection of the electronic template at stage 1005. The screenshot 1100 depicts views if images of respective forms of available blank templates. The available templates include templates 1105, 1110, 1115, 1120, 1125 and 1130. The user can select one of the blank templates 1105-1130 by clicking with a mouse or tapping a touch screen, for example.

As an alternative to picking a blank template from the screenshot 1100, the user could select an existing, partially filled-in, template from the list of templates 910 shown in the screenshot 900 of FIG. 9. The user can select one or more of the templates in the template list 910 by checking one of the boxes next to the name of the desired templates.

At stage 1010, the client application 122 retrieves an electronic template from the memory 125, the template/forms database 135 or from the backend server 110 and the template database 160 (or the forms database 170 in the case of a partially filled-in form/template). Alternatively, the client application 122 could receive the electronic template from another user device. Receiving a partially completed electronic form/template from another user device could be done, for example, when a transfer of responsibility for completing a job associated with a form is transferred from one user in an organization to another user.

At decision block 1012, the client application determines whether to render the electronic template in Form View or Field view. The decision could be made without user input be determining a type of user device that the selection is coming from and rendering a default view. A default view for a smart phone could be the Field View. A default view for a tablet could be either the Form View or the Field View, as determined by user settings, for example. Alternatively, the client application 122 could request a selection of the type of view from the user via the user interface of the user device.

Figure 12:
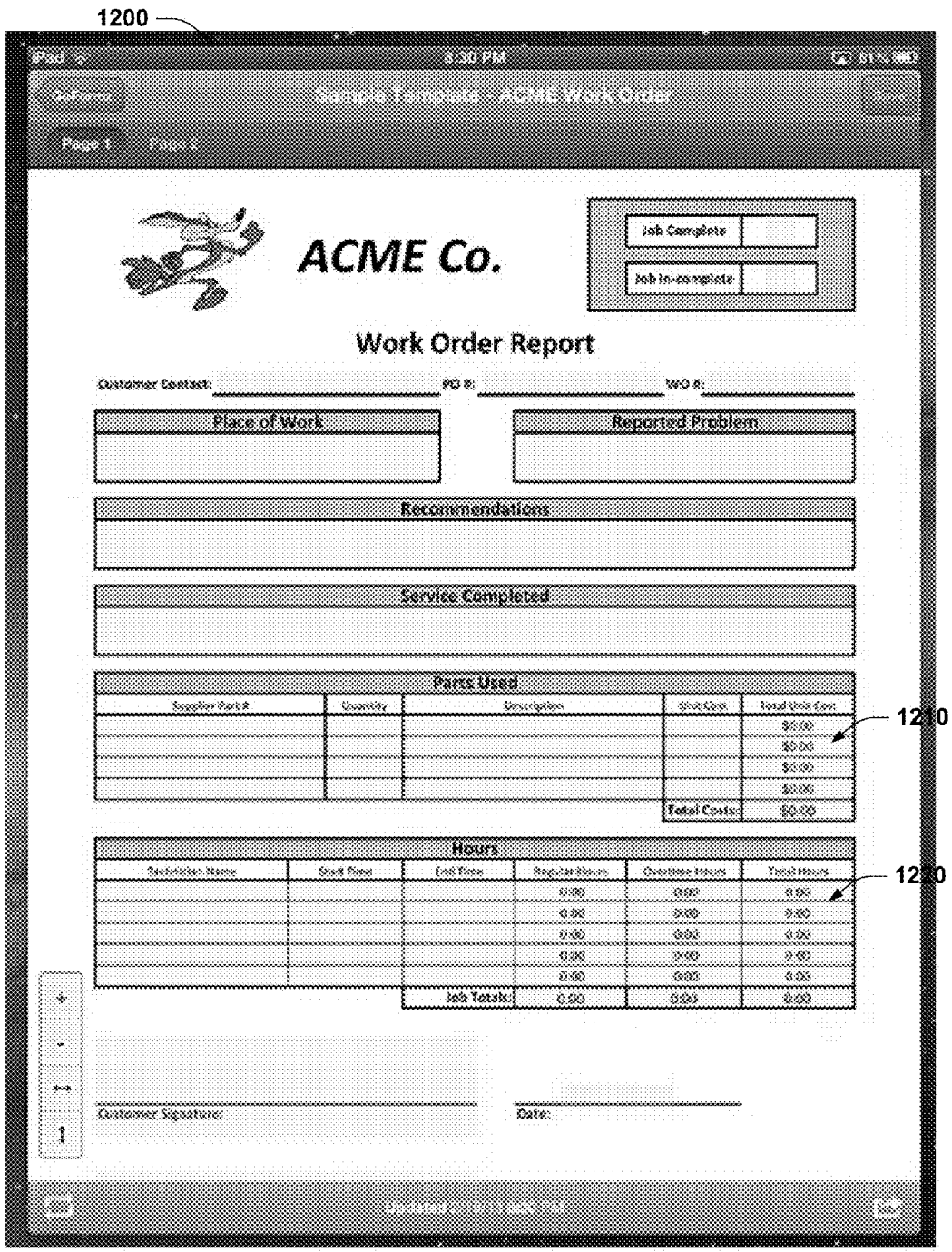
FIG. 12 shows a completed electronic form created by the process of FIG. 10.

If the client application determines that a Form View should be rendered, the process 1000 continues at stage 1015, where the client application 122 causes the background image of the selected template to be displayed on a display of the user device. At stage 1020, the plurality of input fields in the selected template are displayed in superimposed fashion over corresponding fields on the image of the selected form. FIG. 12 shows a screenshot 1200 of a form selected at stage 1005 and rendered at stages 1015 and 1020. The superimposed input fields are illustrated in a first Table 1210 and a second Table 1220 where cells containing values of "0.00" are input fields that are configured to determine values based on values of other cells in the Tables 1210 and 1220. Since none of the other cells in the Tables 1210 and 1220 have values, the computations default to a value of 0.00.

Figure 13:
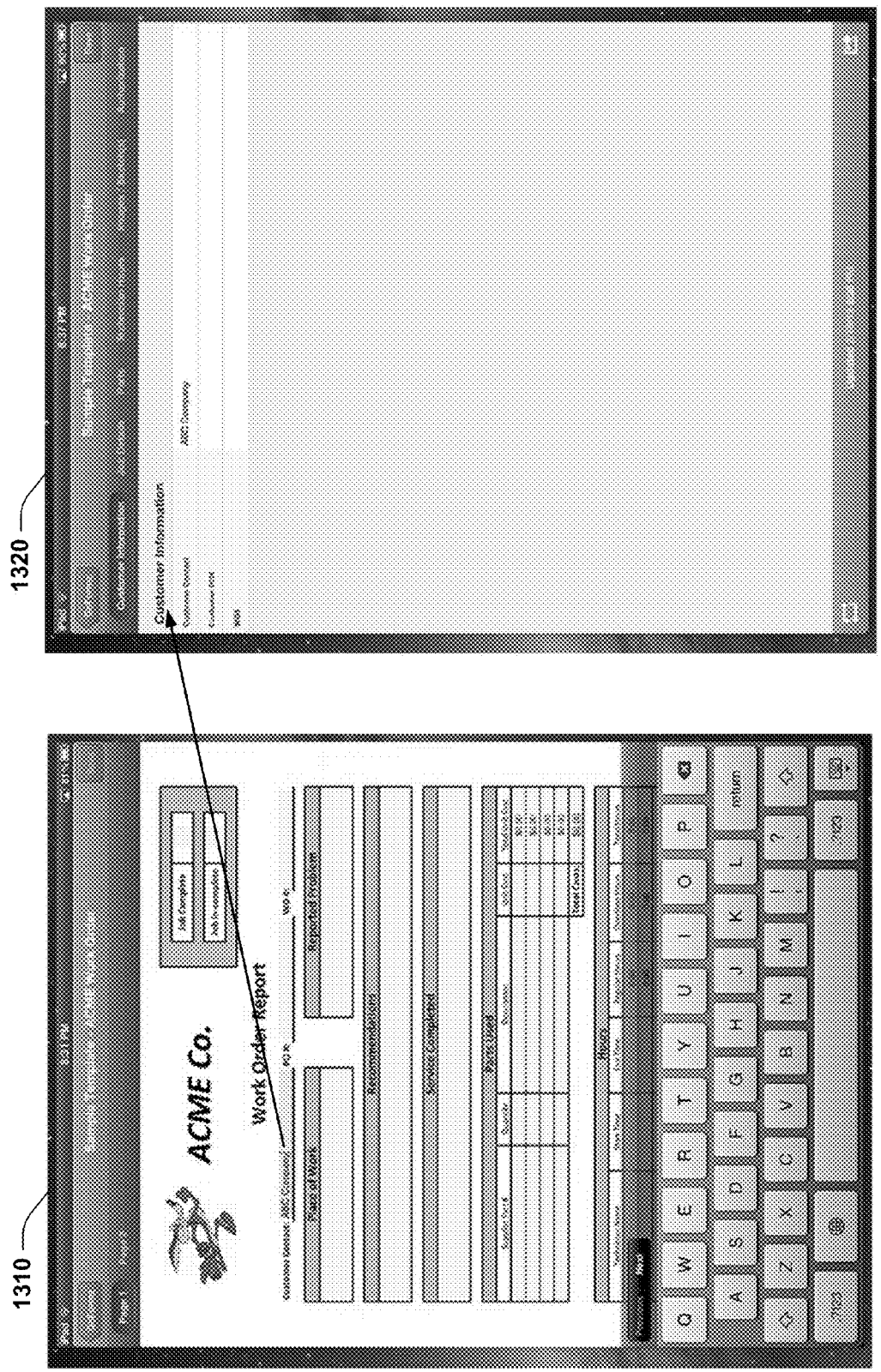
FIG. 13 shows a pair of screenshots showing interconnections between items in form view and respective items in a field view created by the process of FIG. 10.

If, at decision block 1012, the client application determines that a Field View is desired, the process 1000 continues at stage 1022 and the client application 122 renders a Field View list of the input fields of the selected template. FIG. 13 shows an example of a Form View 1310 and the corresponding Field View 1320 of the same template.

At stage 1025, the user interacts with the user interface of the client application 122 to select one of the input fields to receive input from the user. The method of input for an individual input field is determined by the field type used to create the template. The input methods are described above in reference to the field types selected at stage 410 of the process 400 in FIG. 4. At stage 1030, the client application receives the user input for the selected input field(s) via the user interface specified by the field type of each input field.

The user can input information to the input fields of the template at stages 1025 and 1030 without internet access or other connection to the backend server 110. When internet access or other type of connection is available, the backend server 110 and the user device can synchronize with the transfer of the information.

If the input field is of the Image field type or the Sketch field type, the input could be an image. In this case, the image can be obtained via a camera on the user device.

Figure 14:
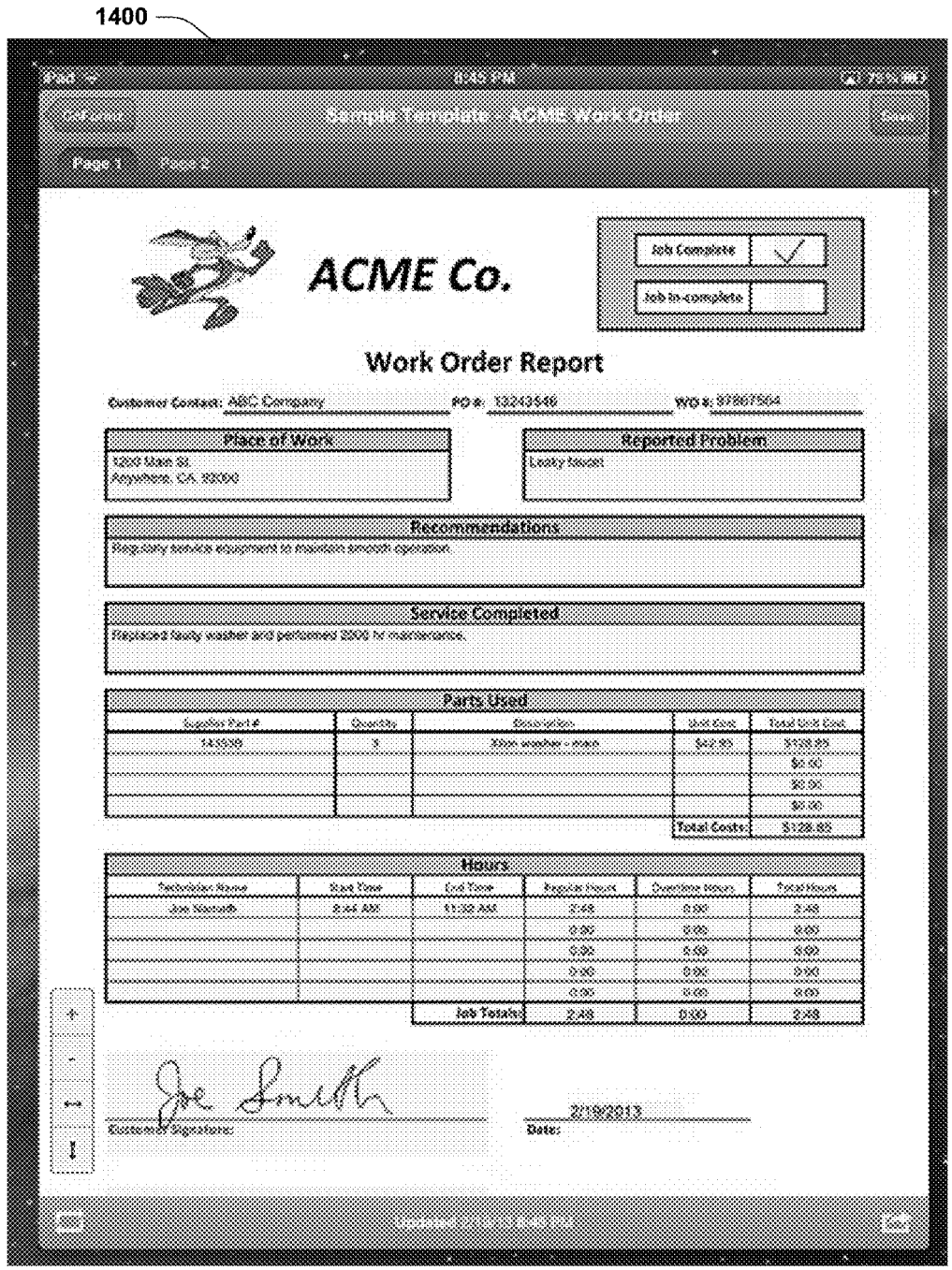
FIG. 14 shows a screenshot of a completed electronic form created by the process of FIG. 10.

At stage 1030, some field types may trigger screen prompts to facilitate the data capture process. Captured information can be edited at any time by re-selecting the field. When saved by the user, all data captured is written to the local memory 125 on the device or on the template/forms database 135 of the non-mobile device 130 at stage 1035. The completed form is also communicated to the backend server 110 which stores the completed form in the forms database 170. FIG. 14 shows a completed form 1400. Once a form is stored at stage 1035, a user may select an action button giving them the option to email the form to one or more users or generate a Portable Document Format (PDF) version of the document that can then be printed or uploaded to a third-party electronic storage system. In addition, other devices in the account can synchronize with the backend server 110 to retrieve the completed form.

The form may not be fully completed when a user is finished with the form. In this situation, a partially completed form can be transferred in responsibility from user to another user. A first user starts the form, finishes his portion and he can transfer it to a second user. Upon transfer to the second user, the form disappears from the first user's Forms tab (see FIGS. 6 and 7, for the Forms tab) of the user interface of the client application 122 and appears on the second user's Forms tab. The second user then takes responsibility for filling out the form using the process 1000 along with doing any tasks that are required. The second user can then transfer the form back to the first user, etc. This is a convenient way for communicating that a first task is done and the second task can be performed by a different user than the user that finished the first task. Such transfer of forms can be done without connection to the backend server 110 via WiFi, for example.

At stage 1040, the client application receives an instruction from the user device to switch from the current view, either Form View or Field view, to the other view. The user may wish to switch from Field View to Form View when he thinks he has completed filling out a form on a smart phone in order to view the electronic form with the background image as a reassurance that all fields are completed. At stage 1045, the client application 122 renders the electronic form in the selected Field View or Form View. FIG. 13 shows an example Form View 1310 and the corresponding Field View 1320 that can both be rendered at stage 1045.

When switching from Form View to Field View at stage 1045, the images and sketches can be selectively viewed from the Field View by clicking on them. Likewise, tables can be similarly viewed in this manner.

The process 1000 is exemplary only and modifications to the process 1000 can be made without departing from the scope of the methods described herein. For example, stages may be omitted, added or rearranged.

Figure 15:
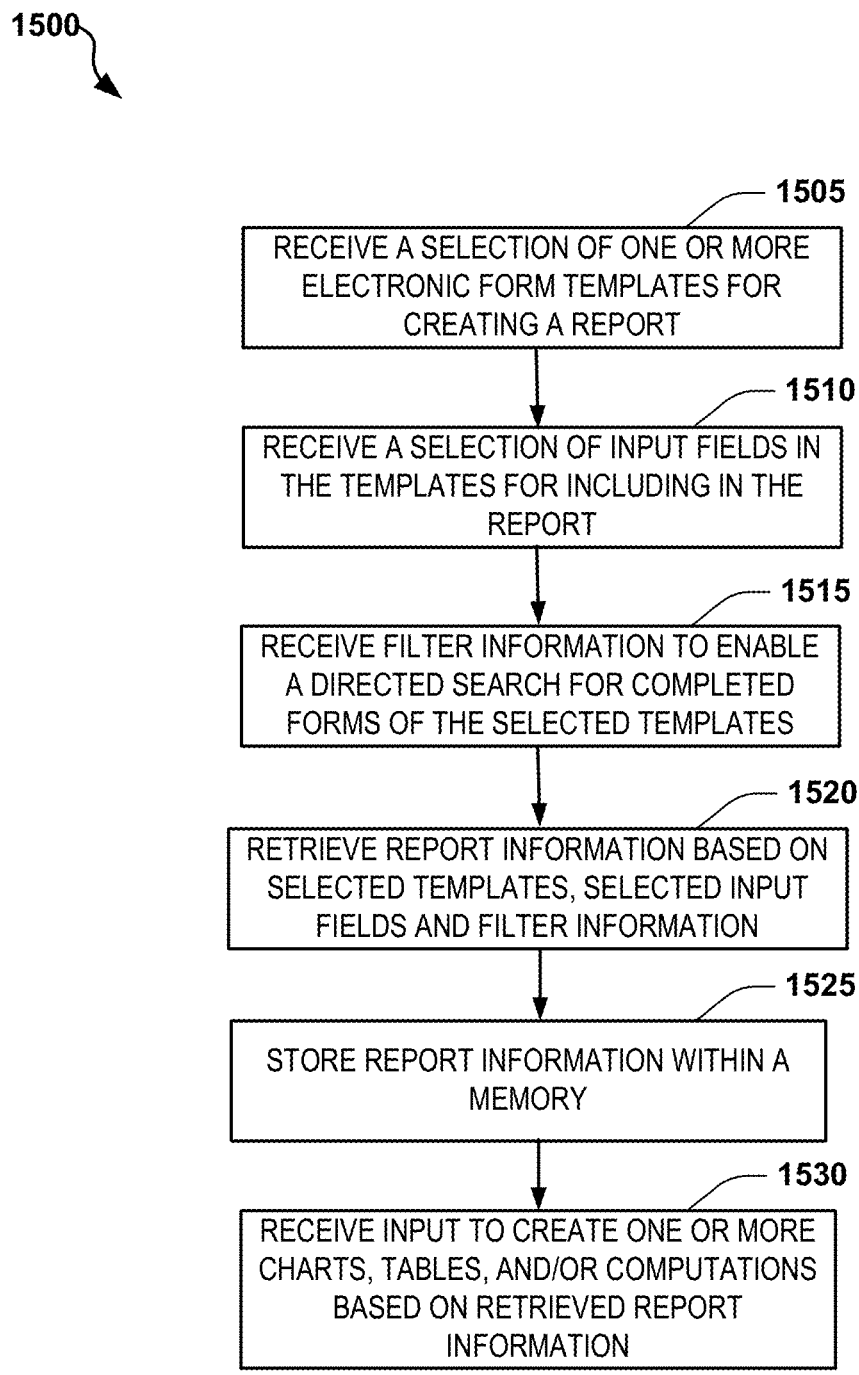
FIG. 15 illustrates a flowchart of an exemplary process for creating a report using information obtained from forms created by the processes of FIGS. 4 and 10 in accordance with the disclosure.
Figure 16:
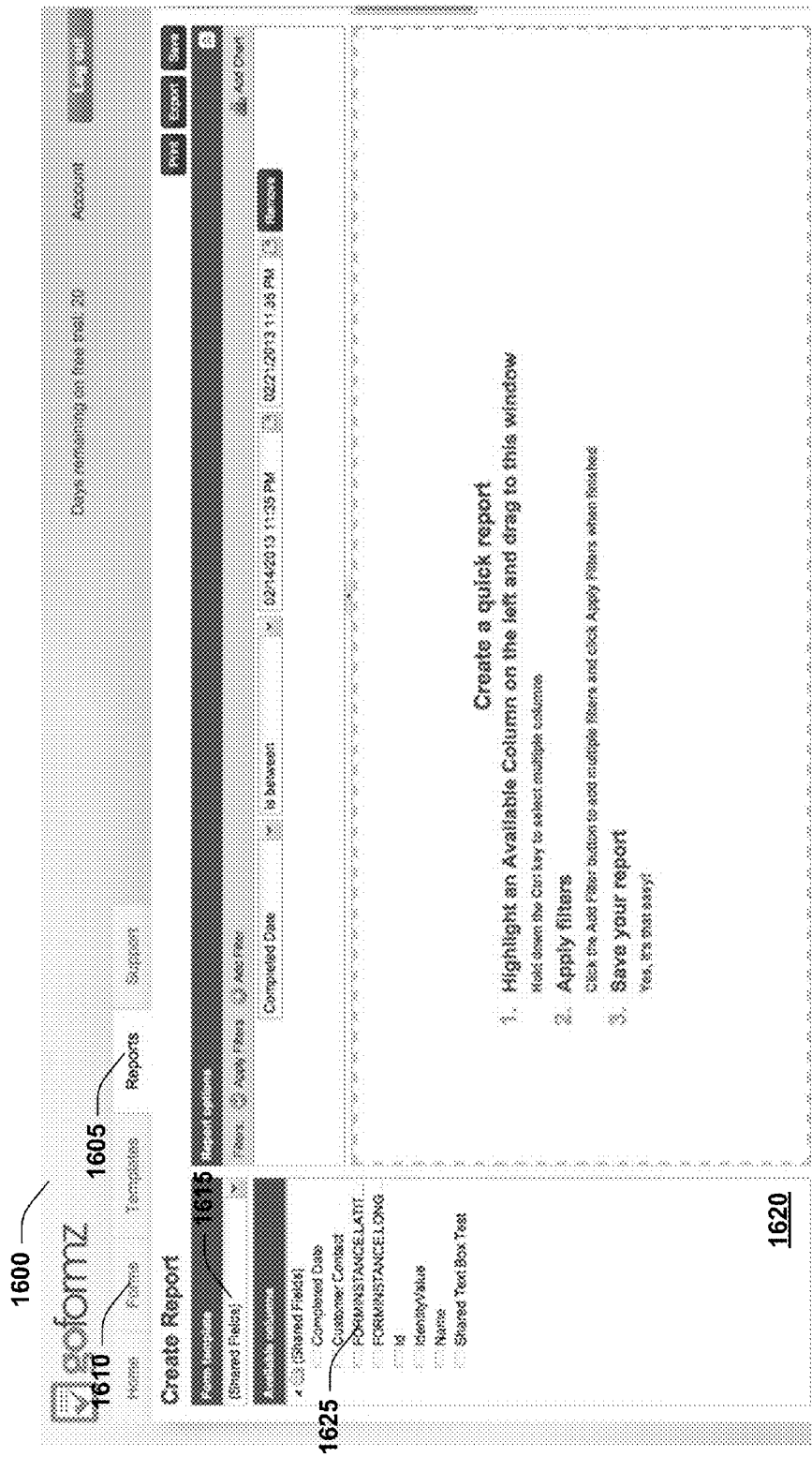
FIG. 16 shows a screenshot of a user interface used in the process of FIG. 15.

Referring to FIG. 15, a process 1500 for creating a report using information obtained from forms created by the processes 400 and 1000 of FIGS. 4 and 10 includes the stages shown. At stage 1505, the client application 122 receives a selection of one or more electronic templates to include in a report. FIG. 16 shows a screenshot 1600 of a user interface used to make selections of templates at stage 1505.

The screenshot 1600 is displayed when a user selects a Reports tab 1605 in the user interface to create a report. The screenshot 1600 displays a section 1620 of selectable form templates. A pull down menu 1615 is currently displaying a Shared Fields selection and a list 1625 of the available shared fields is displayed in the section 1620. The shared fields are those fields that the current user, or other users in the current user's account have made available in other forms. The shared fields list 1625 appears by default since these fields are available without selecting a template.

The pull down menu 1615 can be used to display a list of any of the templates used to create forms on the user device and then select any of the templates to be included in the report. By selecting a certain template in the pull down menu list (see list 1710 in FIG. 17) to be include in a report at stage 1505, every instance of a form created by any user in the user's account can be utilized to populate the report with information. A user can create reports by obtaining information from all the forms listed in a forms tab 1610 or from the forms in the database 170 that are associated with the user's account.

Figure 17:
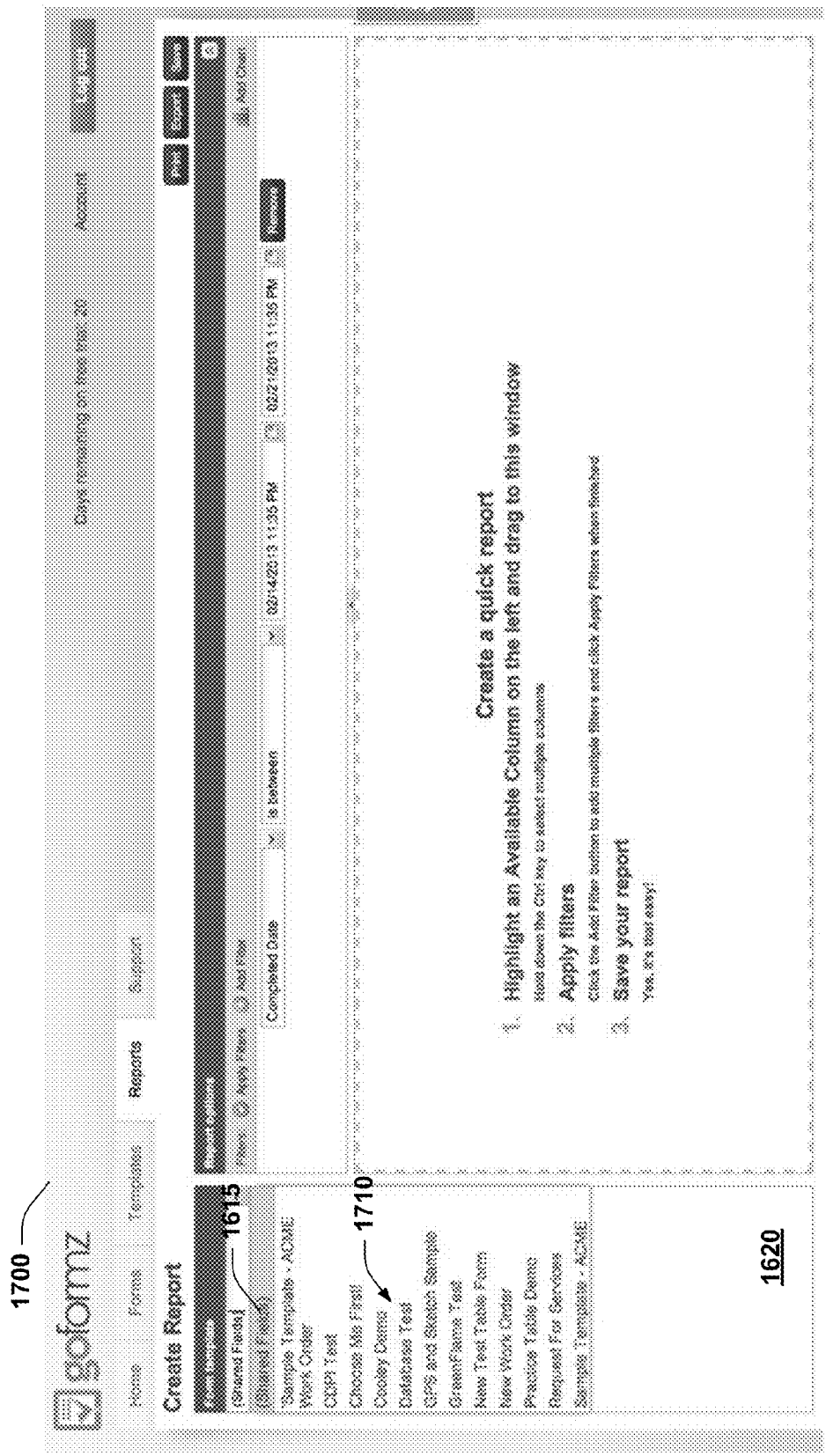
FIG. 17 shows a screenshot of another user interface used in the process of FIG. 15.
Figure 18:
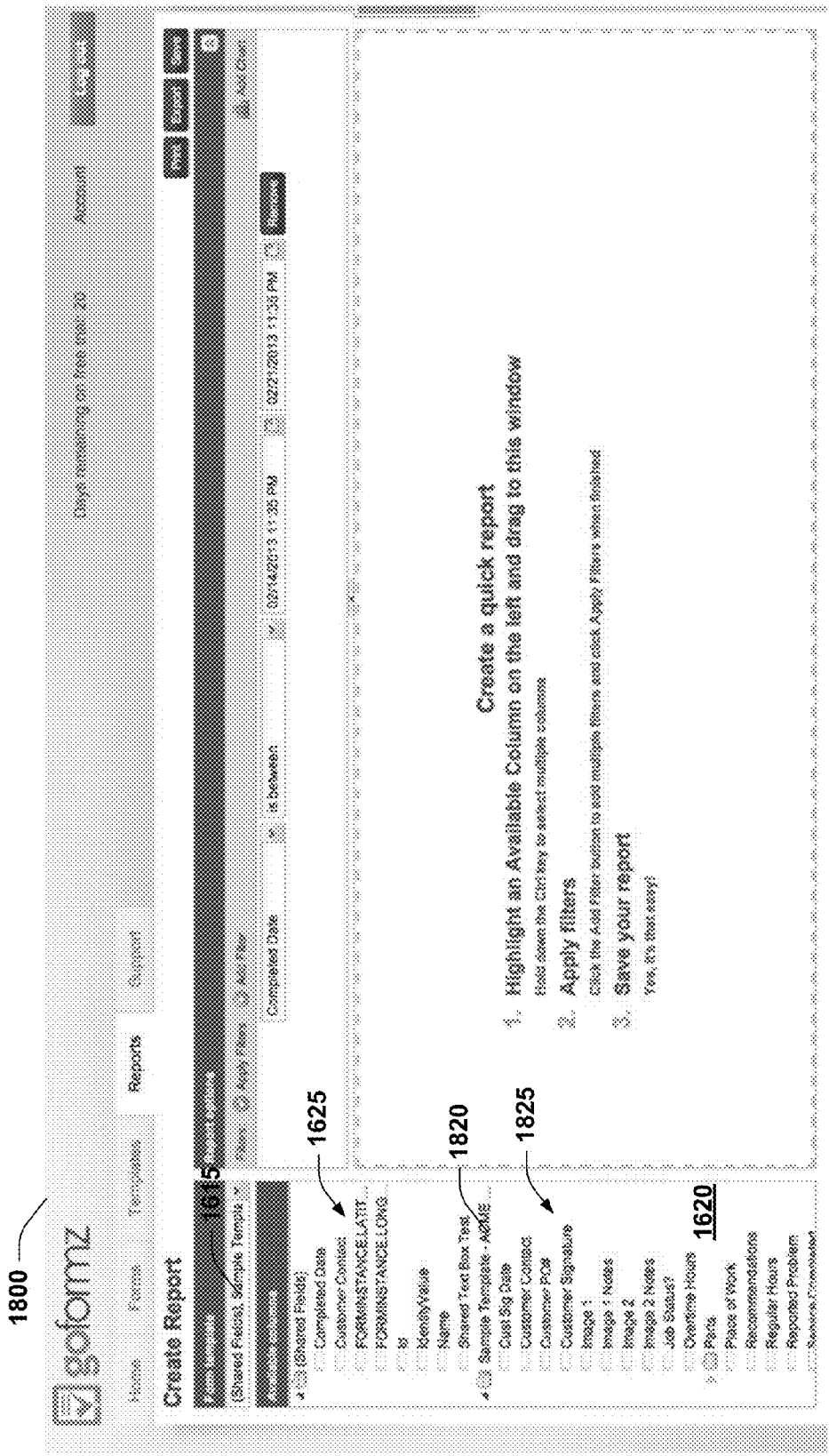
FIG. 18 shows a screenshot of another user interface used in the process of FIG. 15.

FIG. 17 shows a screenshot 1700 showing a list of available templates 1710 in the pull down menu 1615. A user can choose from any templates in the list 1710 to generate a report. After a user selects one of the templates, a list of all the fields in the one selected template are displayed in a list 1825, as illustrated in FIG. 18.

After selecting the templates at stage 1505, the process 1500 continues to stage 1510 where the client application 122 receives a selection of input fields that are available in the shared fields and any fields included in the selected templates. FIG. 18 shows a screenshot 1800 where a user has selected one template from the pull down menu 1615, the template entitled "Sample Template—ACME . . . ". FIG. 18 displays the list of Shared Fields 1625 and a list of fields 1825 available in the selected template 1820 entitled "Sample Template ACME . . . " The user can choose any of the fields in the shared fields list 1625 or any of the fields in the list of fields 1825 of the "Sample Template ACME . . . " template to add to the report.

Figure 19:
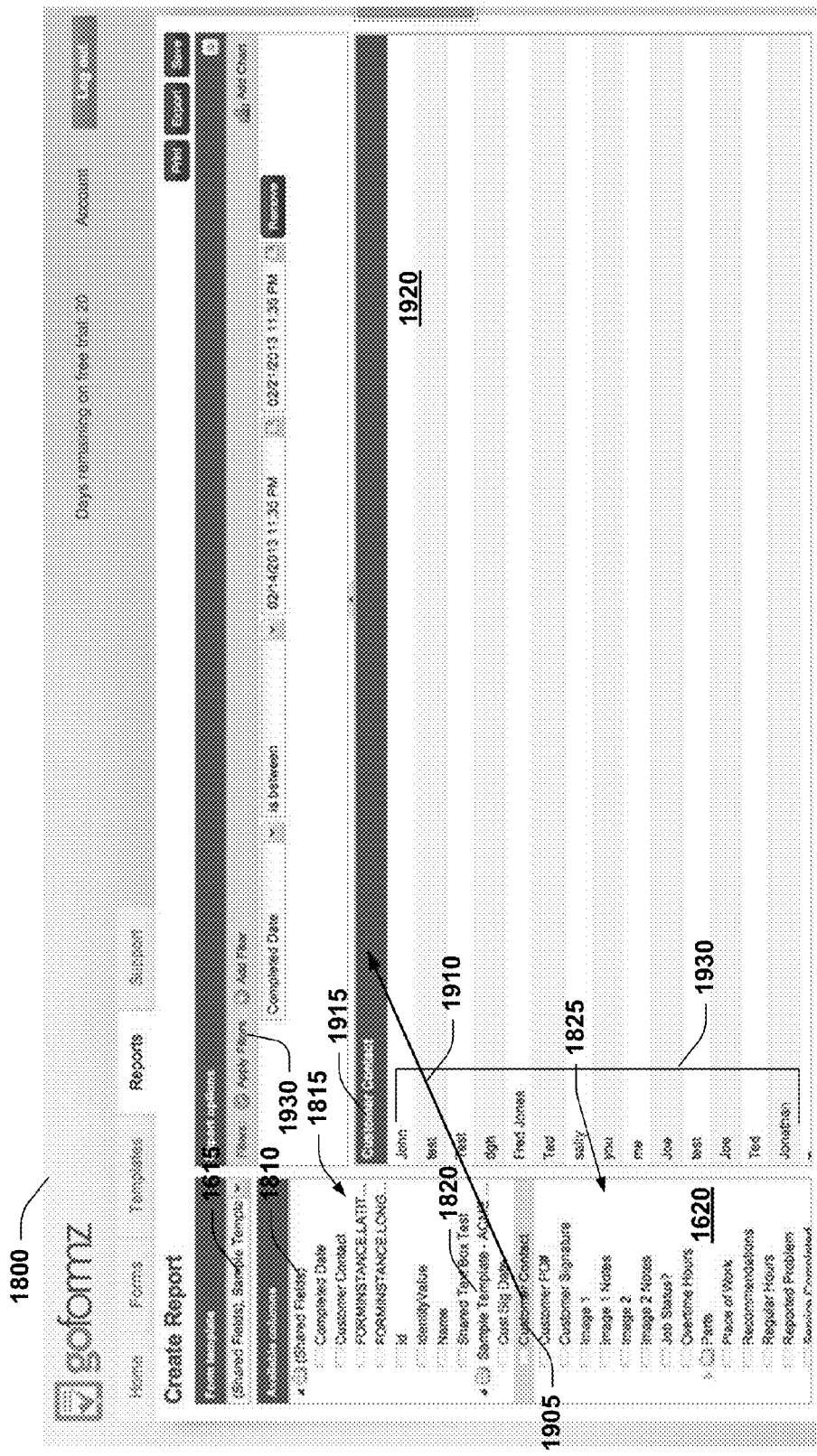
FIG. 19 shows a screenshot of another user interface used in the process of FIG. 15.

FIG. 19 shows the screenshot 1800 where a user is using a drag-and-drop method to select a Customer Contact field 1905 from the ACME list 1820 and drag it to a report editor canvas 1920 (as indicated by an arrow 1910) to be entered as a report entity 1915. The user can continue to drag-and-drop as many fields as desired from the lists 1625 and 1825. As one or more fields is added to the report editor canvas 1910, a list of forms (draft forms and completed forms) 1930 appears on the editor canvas 1910. The list 1930 includes all instances of forms that include the fields that have been added to the editor canvas 1910.

Figure 20:
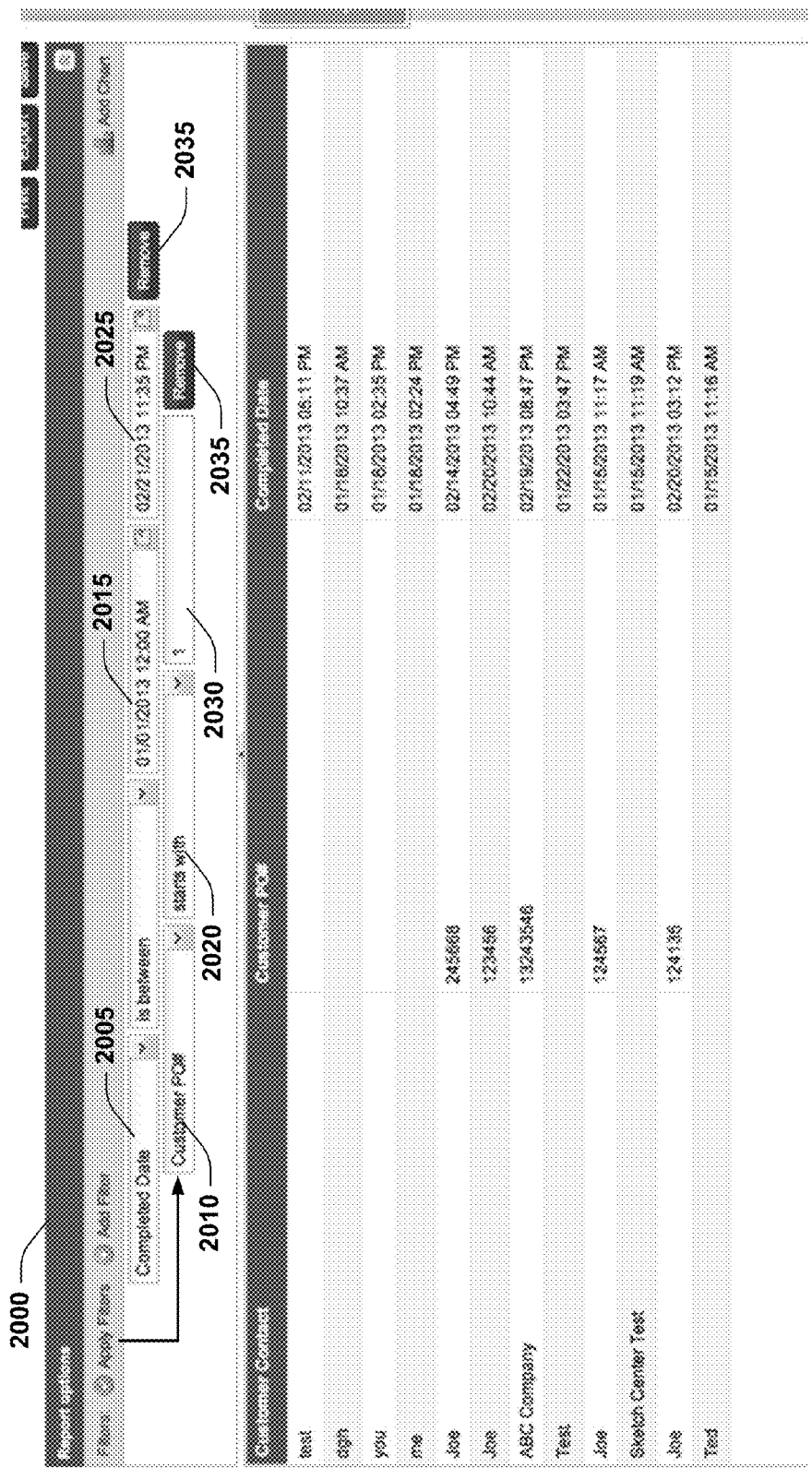
FIG. 20 shows a screenshot of another user interface used in the process of FIG. 15.

After a user has selected templates at stage 1505 and fields at stage 1510, the process 1500 continues at stage 1515 where the user can reduce the number of form instances listed in the list 1930 of the editor canvas 1910. A user can activate the filter method by selecting an "Apply Filter" button 1930. FIG. 20 shows a screenshot 2000 that is displayed by the client application 122 at stage 1515 in response to a user selecting the Apply Filter button 1930. At stage 1515, the client application 122 receives filter information to enable a directed search for fields in completed forms of the types previously selected (Shared Fields and Sample Template—ACME in this example). A pull down menu 2005 shows a "Completed Date" selection to which the user can select beginning and ending dates in a beginning date field 2015 and an ending date field 2025. The user can further narrow the filter search by specifying the name of fields in a second pull down menu 2010, and fields 2020 and 2030 that allow the user to search for the selected field listed in the pull down menu 2010 that is characterized by certain text. For example, the screenshot 2000 shows a user searching for any fields named Customer PO# that start with a number 1. When the user has narrowed the search to arrive at only the desired fields, the user returns to the screenshot 1900 of FIG. 19.

The user can continue to reduce the number of form instances by adding more filters for different fields in the pull down menu (see pull down menus 2005 and 2010). A user can remove one of the added filters by selecting a remove button 2035.

After the user has completed the drag-and-drop selections and the filter selections of templates and fields at stages 1510 and 1515, and the filtering of form instances at stage 1515, the process 1500 continues to stage 1520 where the client application 122 retrieves report information from the shared fields and form instances corresponding to the selected templates, selected fields and selected filter information. At stage 1525, the client application 122 stores the information retrieved at stage 1520 to the memory 125, the template/forms database 135 and/or communicates the retrieved information to the backend server 110 to be stored in the forms database 170.

Figure 21:
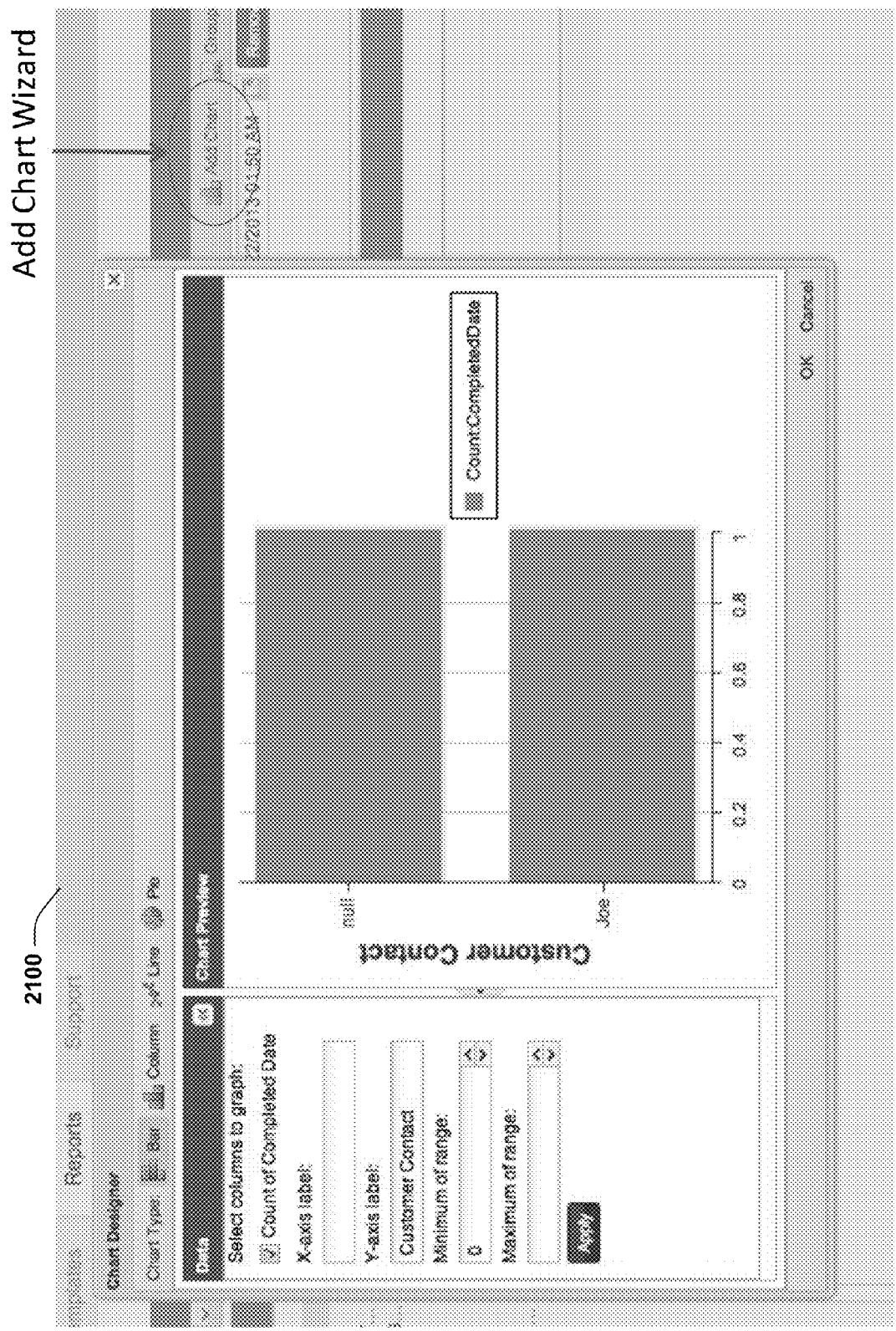
FIG. 21 shows a screenshot of another user interface used in the process of FIG. 15.

At Stage 1530, the client application receives user input to create one or more charts, tables and/or computations based on the data retrieved at stage 1520. FIG. 21 shows a screenshot 2100 that shows a chart wizard where a user can create a chart such as a pie chart, a bar graph, a line graph, etc. using the user interface shown in the screenshot 2100.

The process 1500 allows a user to create a report without any existing knowledge as to what data is available. Once a user sees what draft forms and completed forms have been retrieved based on the templates and fields selected at stages 1505 and 1510, the user can selectively eliminate unwanted forms using the filters at stage 1515 so as to create the report to show only what they want to show. The user interfaces allow a user to choose one or more templates, create a report to include any desired fields in the selected templates and any shared fields, and query across all existing forms, draft forms and/or completed forms, to bring in all data corresponding to the selected fields.

The process 1500 is exemplary only and modifications to the process 900 can be made without departing from the scope of the methods described herein. For example, stages may be omitted, added or rearranged.

Figure 22:
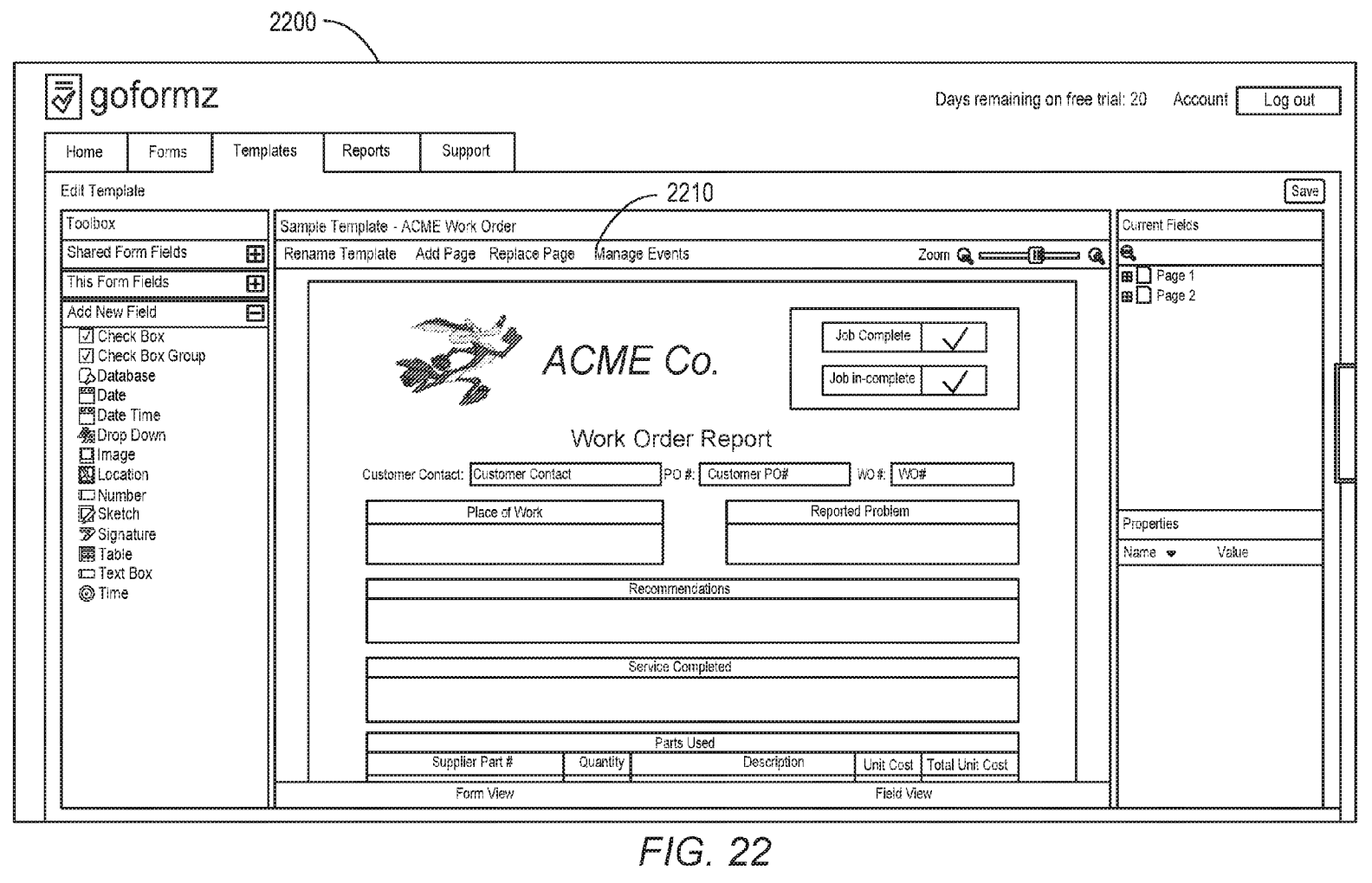
Figure 23:
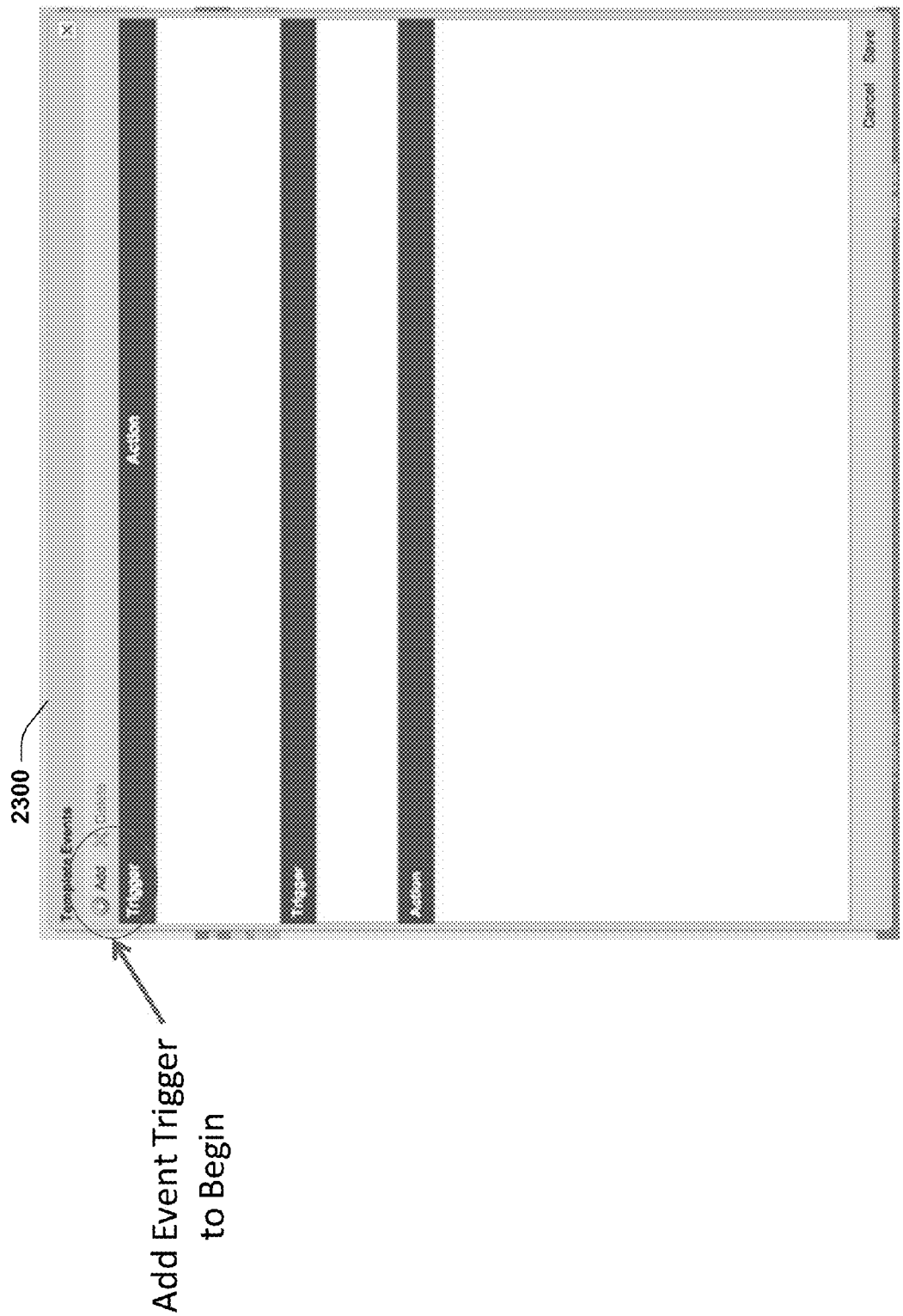
FIG. 23 shows a screenshot of another user interface used to create and manage events triggered by completion of electronic forms in accordance with the disclosure.
Figure 24:
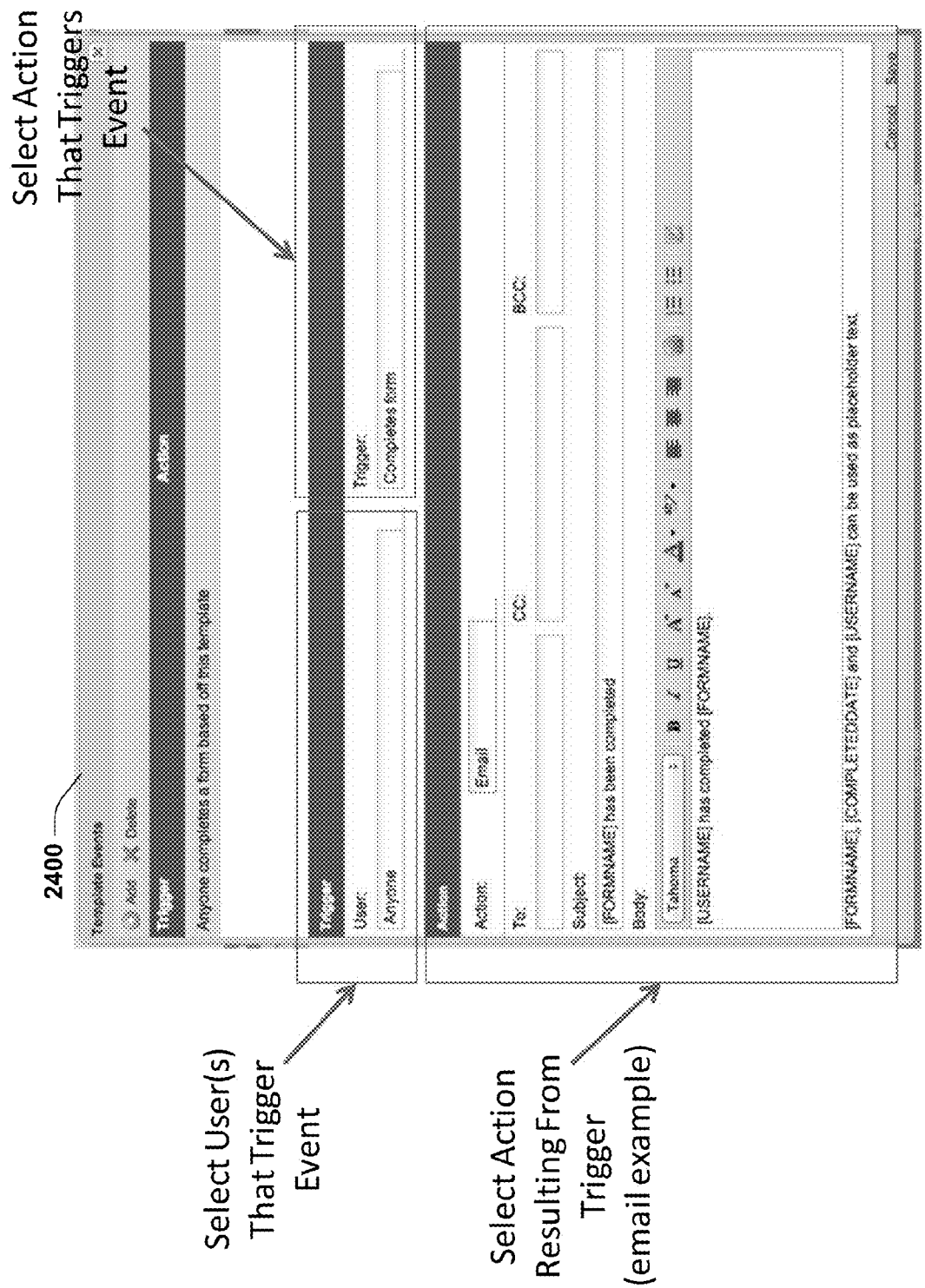
FIG. 24 shows a screenshot of another user interface used to create and manage events triggered by completion of electronic forms in accordance with the disclosure.

As described above, a user can create a template using the process 400 and the template can be configured by the user to automatically trigger certain prescribed events when certain trigger events occur. FIGS. 22-24 show various screenshots of user interfaces used to create and manage these events and triggers. For example, a template could be configured to automatically Email a list of users when a form based on one of the templates is completed. The client application 122 can create a PDF of the completed form and the resulting PDF image can be emailed automatically to the list of users.

FIG. 22 shows a screenshot 2200 of the template tab used to create a template using the process 400 described above. At stage 410, when the user is specifying the parameters of input fields and the like, the user can select a Manage Events button 2210. In response, the client application 122 displays screenshots 2300 and 2400 shown in FIGS. 23 and 24, respectively. The user interface provided by the screenshots 2300 and 2400 allow a user to fully configure what type of trigger events occurring during the filling-out of a form/template will result in an event such as a generation of an Email, a text message, a generation of a report, etc.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

In conclusion, the teachings disclosed herein provide, among other things, a system and method for providing for conversion of paper forms to electronic forms, providing for capturing information in the electronic forms and managing the electronic forms among a group of users. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A non-transient computer readable medium storing program code which, when executed by a processor, causes the processor to:
   receive an image of a form;
   receive form template information for a template associated with an electronic form, the form template information specifying a plurality of input fields corresponding to portions of the image, the form template information including a first input field type selection and first field location information for a first input field of the plurality of input fields wherein the first input field type selection is selected from a plurality of input field types and the first field location information is defined relative to the image;
   receive shared field information designating one of the plurality of input fields as a shared field, wherein the shared field information is included within the form template information and the shared field is used in another template including an additional plurality of input fields;
   store the form template information within a memory;
   wherein the electronic form is configured to be rendered in a form view by superimposing a representation of the first input field over the image of the form.

2. The computer readable medium of claim 1 wherein the the program code further include code which, when executed by a processor, causes the processor to:
   receive user input for one of more of the plurality of input fields presented through a field view wherein in the field view the plurality of input fields are displayed without displaying the image of the form;
   switch from the field view to the form view wherein the user input is included in the one or more of the plurality of input fields in the form view and superimposed over the image of the form.

3. The computer readable medium of claim 1 wherein the form template information further specifies a second input field, the form template information further including a second input field type of the second input field and second field location information for the second input field.

4. The computer readable medium of claim 3 wherein the image of the form includes a plurality of fields, the first field location information corresponding to a position of a first of the plurality of fields and the second field location information corresponding to a position of the second input field.

5. The computer readable medium of claim 1, wherein the plurality of field types include at least one of:
   a database field type enabling selection of a stored group of input entities;
   an image field type;
   a sketch field type through which user-generated image input may be received;
   a location field type;
   a formula field type disposed to utilize a value associated with at least a second input field to determine, in accordance with a formula, a value associated with the first input field; and
   a table field type.

6. The computer readable medium of claim 1, wherein the plurality of field types include at least one of:
   a text box field type;
   a date and/or time field type;
   a drop-down menu field type; and
   a signature field type.

7. The computer readable medium of claim 1, wherein the program code further causes the processor to communicate the form template information to at least one user in a group of users.

8. The computer readable medium of claim 1 wherein the program code further include code which, when executed by a processor, causes the processor to receive user input relating to a field view template wherein in response to a determination to render the electronic form in the field view the plurality of input fields are displayed without displaying the image of the form, the plurality of input fields being displayed in response to the determination in an order of appearance specified by the field view template wherein the order of appearance is different from an order in which the plurality of input fields are rendered relative to the image of the form.

9. A non-transient computer readable medium storing program code which, when executed by a processor, causes the processor to:
   receive a selection of an electronic form;
   select one of a plurality of input fields to receive user input presented through a field view wherein in the field view the plurality of input fields are displayed without displaying the image of a form;
   receive user input for the one of the plurality of input fields; and
   switch from the field view to the form view wherein the user input is included in the one of the plurality of input fields in the form view and superimposed over the image of the form.

10. The computer readable medium of claim 9 wherein the program code further causes the processor to receive shared field information designating another of the plurality of input fields as a shared field, wherein the shared field information is included within form template information associated with the electronic form and the shared field is used in another template including an additional plurality of input fields.

11. The computer readable medium of claim 9 wherein the program code further include code which, when executed by a processor, causes the processor to receive user input relating to a field view template wherein in response to a determination to render the electronic form in the field view the plurality of input fields are displayed without displaying the image of the form, the plurality of input fields being displayed in response to the determination in an order of appearance specified by the field view template wherein the order of appearance is different from an order in which the plurality of input fields are rendered relative to the image of the form.

12. A method, comprising:
    sending, to a user device, an image of a form;
    sending, to the user device, first form template information specifying at least a first plurality of input fields, the first form template information including first field location information defined relative to the image and shared field information designating another of the first plurality of input fields as a shared field, wherein the shared field information is included within second form template information specifying a second plurality of input fields and wherein the second form template information is sent to another user device;
    wherein the user device is configure to render an electronic form by superimposing a representation of a first input field of the plurality of input fields over the image of the form; and
    receiving, from the user device, first input data corresponding to the first input field.

13. A method, comprising:
    receiving, from a user device, a request for an electronic form template;
    sending, to the user device, the electronic form template wherein the electronic form template is useable to generate an electronic form and includes:
        first data representing an image of a form;
        second data defining a position of at least one input field relative to the image of the form, and
        third data representing a first field type associated with the first input field, the first field type being one of a plurality of field types;
    wherein the user device is configured to receive user input for the first input field through a field view wherein in the field view a plurality of input fields are displayed without displaying the image of a form and wherein the user device is further configured to switch from the field view to the form view wherein the user input is included in the first input field in the form view and superimposed over the image of the form;
    receiving, from the user device, the first input data; and
    electronically storing the first input data.

14. A method comprising:
    receiving an image of a form;
    receiving form template information specifying at least a first input field and first field location information for the first input field wherein the first field location information is defined relative to the image and wherein the first input field is disposed to receive data input;
    storing the form template information within a memory of the user device;
    receiving user input for the first input field when presented through a field view on a display of the user device wherein in the field view the first input field is displayed without displaying the image of the form; and
    switching from the field view to a form view wherein the user input is included in the first input field in the form view and rendered on the display by superimposing a representation of the first input field over the image of the form.

\* \* \* \* \*